(12) United States Patent
Choi et al.

(10) Patent No.: US 8,936,887 B2
(45) Date of Patent: Jan. 20, 2015

(54) COMPOSITE ELECTROLYTE MEMBRANE FOR FUEL CELL, METHOD OF MANUFACTURING THE MEMBRANE, AND FUEL CELL INCLUDING THE MEMBRANE

(75) Inventors: Seong-woo Choi, Yongin-si (KR); Dae-jong Yoo, Seoul (KR); Ki-hyun Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 349 days.

(21) Appl. No.: 13/365,680

(22) Filed: Feb. 3, 2012

(65) Prior Publication Data

US 2012/0321992 A1 Dec. 20, 2012

(30) Foreign Application Priority Data

Jun. 15, 2011 (KR) ........................ 10-2011-0057974

(51) Int. Cl.
*H01M 8/14* (2006.01)
*H01M 8/10* (2006.01)
*H01M 8/02* (2006.01)

(52) U.S. Cl.
CPC .......... *H01M 8/1053* (2013.01); *H01M 8/0291* (2013.01); *Y02E 60/521* (2013.01)
USPC .......................................... 429/477; 429/478

(58) Field of Classification Search
USPC ................................................ 429/477, 478
See application file for complete search history.

(56) References Cited

U.S. PATENT DOCUMENTS

| 2005/0256296 | A1 | 11/2005 | Kiefer et al. |
| 2006/0280984 | A1 | 12/2006 | Lee et al. |
| 2007/0231653 | A1 | 10/2007 | Kim et al. |
| 2009/0123812 | A1 * | 5/2009 | Choi et al. ..................... 429/42 |

FOREIGN PATENT DOCUMENTS

| JP | 2000-058085 | 2/2000 |
| JP | 2010-199061 | 9/2010 |
| KR | 10-2007-0098323 | 10/2007 |

OTHER PUBLICATIONS

U.S. Appl. No. 13/100,530, filed May 4, 2011, Choi et al., Samsung Electronics Co., Ltd. and SNU R&DB Foundation.
U.S. Appl. No. 13/242,972, filed Sep. 23, 2011, Yoo et al., Samsung Electronics Co., Ltd.

* cited by examiner

*Primary Examiner* — Jane Rhee
(74) *Attorney, Agent, or Firm* — Cantor Colburn LLP

(57) ABSTRACT

A composite electrolyte membrane for a fuel cell with a controlled phosphoric acid-based material retention ratio. The composite electrolyte membrane includes an electrolyte membrane containing a compound having a phosphoric acid-based material-containing functional group. Also disclosed are a method for manufacturing the composite electrolyte membrane, and a fuel cell including the composite electrolyte membrane.

24 Claims, 4 Drawing Sheets

COMPOSITE ELECTROLYTE MEMBRANE FOR FUEL CELL, METHOD OF MANUFACTURING THE MEMBRANE, AND FUEL CELL INCLUDING THE MEMBRANE

CROSS-REFERENCE TO RELATED APPLICATION

This application claims the benefit of Korean Patent Application No. 10-2011-0057974, filed on Jun. 15, 2011 in the Korean Intellectual Property Office, the disclosure of which is incorporated herein by reference.

BACKGROUND OF THE INVENTION

1. Field of the Invention

Aspects of the present invention relate to a composite electrolyte membrane for a fuel cell, a method of manufacturing the composite electrolyte membrane, and a fuel cell including the composite electrolyte membrane.

2. Description of the Related Art

Fuel cells are a source of future clean energy that are alternatives to fossil energy, and have high output density and high energy conversion efficiency, which means fuel cells are applicable in a vast range of fields such as in pollution-free vehicles, domestic power generating systems, mobile electronic appliances such as mobile communication devices, medical equipment, and various devices for military and aerospace uses.

A fuel cell includes a cathode, an anode, and an electrolyte membrane disposed between the cathode and the anode. In the anode, to which fuel gas is supplied, oxidation of the fuel gas takes place. In the cathode, to which oxygen is supplied, reduction reaction of oxygen occurs. Electrons generated from the cathode and anode reactions generate electricity, and collaterally generate heat and moisture.

A high-temperature fuel cell generally uses phosphoric acid as an electrolyte. Thus, such a system needs an electrolyte membrane that is able to absorb a sufficient amount of phosphoric acid and withhold it from being drawn out of the electrolyte membrane, and that has high durability. However, electrolyte membranes known so far are not satisfactory in terms of the amount of phosphoric acid they can hold and the ability to retain phosphoric acid, thereby improvement in this regard still being necessary.

SUMMARY OF THE INVENTION

Aspects of the present invention provide a composite electrolyte membrane for fuel cells that has improved durability and retention of phosphoric acid, and a fuel cell having improved cell performance that employs the composite electrolyte membrane According to an aspect of the present invention, a composite electrolyte membrane for a fuel cell include includes: a core electrolyte membrane; and first electrolyte membranes disposed on opposite surfaces of the core electrolyte membrane and including a compound having a phosphoric acid-based material-containing functional group, wherein the phosphoric acid-based material retention ratio of the first electrolyte membrane is higher than that of the core electrolyte membrane.

According to another aspect of the present invention, a method of manufacturing the above-described electrolyte membrane for a fuel cell includes: coating a composition including a compound having a phosphoric acid-based material-containing a functional group and a first solvent on a substrate and thermally treating the coated product to form a first electrolyte membrane; forming a core electrolyte membrane on a surface of the first electrolyte membrane; coating a composition including a compound having a phosphoric acid-based material-containing functional group and the first solvent on a surface of the core electrolyte membrane and thermally treating a coated product to form another first electrolyte membrane, thereby forming the composite electrolyte membrane; and separating the composite electrolyte membrane from the substrate.

According to another aspect of the present invention, a method for manufacturing the above-described composite electrolyte membrane for a fuel cell includes forming first electrolyte membranes on opposite surfaces of a core electrolyte membrane by coating a composition including a compound having a phosphoric acid-based material-containing functional group and a first solvent on the opposite surfaces of the core electrolyte membrane and thermally treating a coated product.

The core electrolyte membrane may be formed by a method including: coating a composition including at least one of compounds represented by Formulae 5 and 6 below and a second solvent on a substrate and thermally treating a coated product, thereby forming a second electrolyte membrane; and separating the second electrolyte membrane from the substrate:

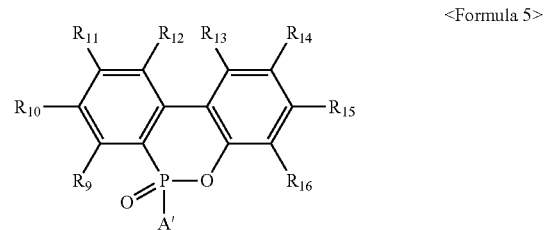
<Formula 5> in Formula 5, A' is a substituted or unsubstituted $C_1$-$C_{20}$ heterocyclic group, a substituted or unsubstituted $C_4$-$C_{20}$ carbocyclic group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ carbocyclic group, a $C_1$-$C_{20}$ heterocyclic group, a halogen atom, a cyano group, or a hydroxy group,

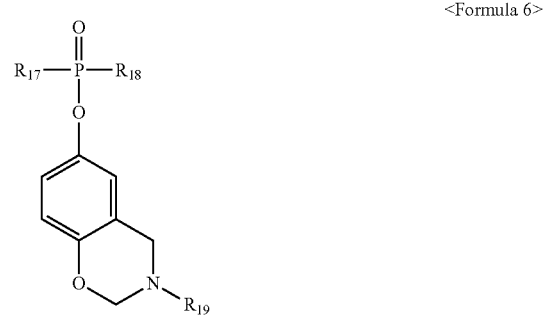
<Formula 6> in Formula 6, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 6A below:

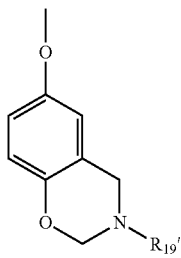

<Formula 6A> in Formulae 6 and 6A, $R_{19}$ and $R_{19'}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

According to another aspect of the present invention, a fuel cell includes the above-described composite electrolyte membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
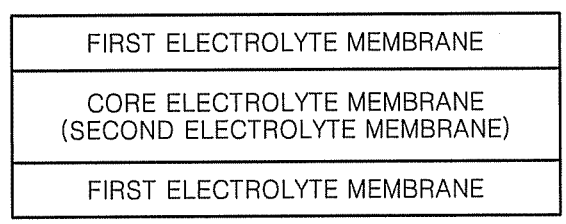
FIG. 1 schematically illustrates a stacked structure of a composite electrolyte membrane according to an embodiment of the present disclosure.

Reference will now be made in detail to the present embodiments of the present invention, examples of which are illustrated in the accompanying drawings. The embodiments are described below in order to explain the present invention by referring to the figures.

An aspect of the present disclosure provides a composite electrolyte membrane including a core electrolyte membrane and first electrolyte membranes that are disposed on opposite surfaces of the core electrolyte membrane and that contain a compound having a phosphoric acid-based material-containing functional group, wherein a phosphoric acid-based material retention ratio of the first electrolyte membranes is higher than that of the core electrolyte membrane.

The first electrolyte membrane and the core electrolyte membrane may include different materials, and thus have different compositions.

The thickness change ratio of the core electrolyte membrane is less than that of the first electrolyte membrane.

The "phosphoric acid-based material retention ratio" is calculated according to Equation 1 below using the weights of an electrolyte membrane before and after an impregnation of the electrolyte membrane with a 60-95 wt % aqueous phosphoric acid-based material solution for a predetermined time at a temperature of 30-85° C. The impregnation time of the electrolyte membrane with the aqueous phosphoric acid material-based solution may be from about 0.5 hours to about 5 hours.

Phosphoric acid-based material retention ratio(%)=
(Weight of electrolyte membrane after impregnation with phosphoric-acid based material−Weight of electrolyte membrane before impregnation with phosphoric acid-based material)/(Weight of electrolyte membrane before impregnation with phosphoric acid-based material)×100   [Equation 1]

The term "thickness change ratio" means the degree of change in thickness of the electrolyte membrane after the impregnation with the phosphoric acid-based material, in particular, which is calculated according to Equation 2 below using the weights of an electrolyte membrane before and after an impregnation with a 60-95 wt % aqueous phosphoric acid-based material solution for a predetermined time at a temperature of 30-85° C. The impregnation time of the electrolyte membrane with the aqueous phosphoric acid material-based solution may be from about 0.5 hours to about 5 hours.

Thickness change ratio(%)=(Thickness of electrolyte membrane after impregnation with aqueous phosphoric acid-based material solution−Thickness of electrolyte membrane before impregnation with aqueous phosphoric acid-based material solution)×100   [Equation 2]

The composite electrolyte membrane may be readily impregnated with phosphoric acid at an early stage, because the first electrolyte membranes on the surfaces have a higher phosphoric acid-based material impregnation ratio than the core electrolyte membrane.

The tensile strength of the core electrolyte membrane may be greater than that of the first electrolyte membranes. The difference in tensile strength between the core electrolyte membrane and the first electrolyte membrane may be from about 4 MPa to about 5 MPa.

For example, the core electrolyte membrane may have a tensile strength of about 7 MPa to about 8 MPa, and in some embodiments, may have a tensile strength of about 6 MPa to about 8.5 MPa. Also for example, the first electrolyte membranes may have a tensile strength of about 2 MPa to about 4 MPa.

The core electrolyte membrane may have, as described above, a small thickness change ratio when impregnated with the phosphoric acid-based material, a high tensile strength, and a high durability. The smaller the thickness change ratio of the electrolyte membrane before and after impregnation with the phosphoric acid-based material, the better the retention of the phosphoric acid-based material. In addition, the retention of the phosphoric acid-based material of the electrolyte membrane may be measured from the change in weight of the electrolyte membrane over time when the electrolyte membrane impregnated with the phosphoric acid-based material is subjected to a predetermined pressure. In one embodiment, the composite electrolyte membrane may have a high phosphoric acid-based material retention.

The phosphoric acid-based material-containing functional group refers to a functional group with the ability to retain a phosphoric acid-based material. Non-limiting examples of the phosphoric acid-based material-containing functional group include a tert-butyl group, an imine group, and a tertiary amine group.

Examples of the phosphoric acid material include phosphoric acid, polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof. In one embodiment, the phosphoric acid material may be ortho-phosphoric acid.

The phosphoric acid-based material retention ratio of the first electrolyte membrane may be about 25% to about 66% greater than that of the core electrolyte membrane.

The first electrolyte membrane may have a phosphoric acid-based material retention ratio of about 400% to about 500%. The core electrolyte membrane may have a phosphoric acid-based material retention ratio of about 250% to about 310%.

The thickness change ratio of the core electrolyte membrane may be about 10% to about 20% less than that of the first electrolyte membranes.

The core electrolyte membrane may have a thickness change ratio of about 105% to about 130%, and the first electrolyte membrane may have a thickness change ratio of about 150% to about 190%.

The composite electrolyte membrane may have a structure including the core electrolyte membrane having high durability and the first electrolyte membranes having a high phosphoric acid-based material retention on opposite surfaces of the core electrolyte membrane. The composite electrolyte membrane may be readily impregnated with phosphoric acid at an early state, because it has the first electrolyte membranes having a high phosphoric acid-based material impregnation ratio on its surfaces.

The core electrolyte membrane with high phosphoric acid retention, disposed in the middle of the composite electrolyte membrane, may hold as much as the impregnated phosphoric acid-based material, and may retard propagation of defects that are likely to occur with formation of a single-layered electrolyte membrane. Therefore, the composite electrolyte membrane may have improved long-term durability, mechanical strength, and conductivity.

The compound having a phosphoric acid-based material-containing functional group may be a first polymer that is a polymerization product of a composition including at least one compound selected from among compounds represented by Formulae 1 to 4 below:

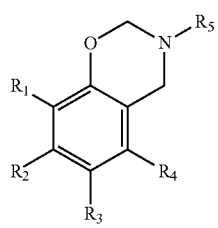

<Formula 1> in Formula 1, $R_1$, $R_2$, $R_3$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group,

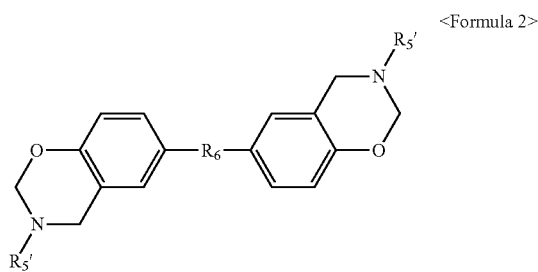

<Formula 2> in Formula 2, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—;

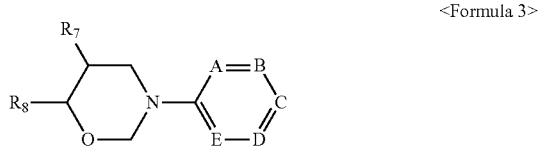

<Formula 3>

In Formula 3, A, B, C, D and E are all carbon; or one or two of A, B, C, D and E is nitrogen and the others are carbon, and $R_7$ and $R_8$ are linked to form a ring, wherein the ring is a $C_6$-$C_{10}$ carbocyclic group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group.

<Formula 4>

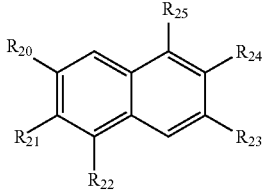

In Formula 4, at least two adjacent groups selected from among $R_{20}$, $R_{21}$ and $R_{22}$ are linked to form a group represented by Formula 4A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group; and at least two adjacent groups selected from among $R_{23}$, $R_{24}$ and $R_{25}$ are linked to form the group represented by Formula 4A below, and the non-selected, remaining group is a $C_1$-$C_{20}$ alkyl group, a $C_1$-$C_{20}$ alkoxy group, a $C_6$-$C_{20}$ aryl group, a $C_1$-$C_{20}$ aryloxy group, a halogenated $C_6$-$C_{20}$ aryl group, a halogenated $C_1$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group.

<Formula 4A>

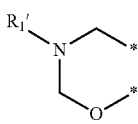

in Formula 4A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the at least two adjacent groups selected from among $R_{20}$, $R_{21}$ and $R_{22}$ of Formula 4 and the at least two adjacent groups selected from among $R_{23}$, $R_{24}$ and $R_{25}$ are linked, respectively.

In Formula 4A, $R_1$ is selected from the groups represented by the following formulae.

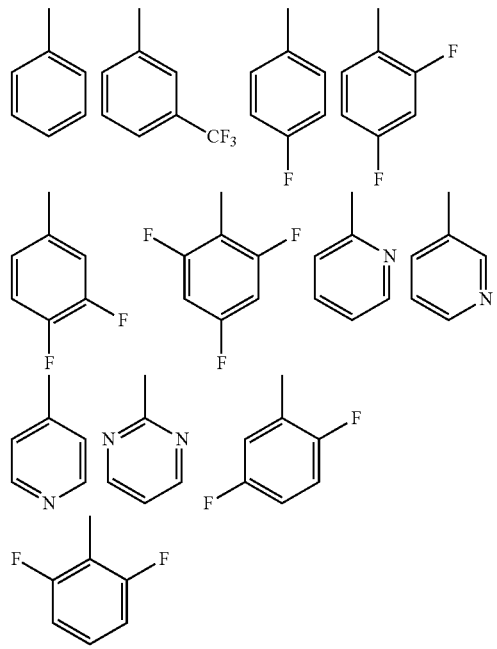

The phosphoric acid-based material-containing functional group of the compound the first electrolyte membranes contain may be a functional group with a high phosphoric acid-based material retention. Examples of the phosphoric acid-based material-containing functional group include a tert-butyl group, an imine group, and a tertiary amine group.

The core electrolyte membrane may be good at retaining the phosphoric acid-based material absorbed through the first electrolyte membranes and may have high durability. The core electrolyte membrane may have a single-layered structure or a multi-layered structure.

The core electrolyte membrane may include a compound having a —P=O group. In some embodiments, the core electrolyte membrane may include a second electrolyte membrane containing a second polymer that is a polymerization product of a composition including at least one compound selected from among compounds represented by Formulae 5 and 6 below:

<Formula 5>

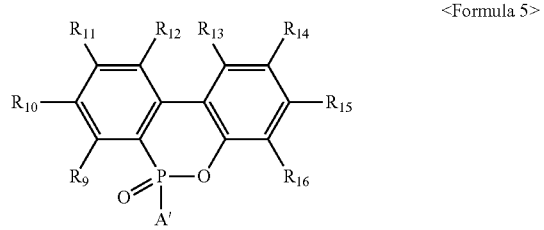

In Formula 5, A' is a substituted or unsubstituted $C_1$-$C_{20}$ heterocyclic group, a substituted or unsubstituted $C_4$-$C_{20}$ carbocyclic group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ carbocyclic group, a $C_1$-$C_{20}$ heterocyclic group, a halogen atom, a cyano group, or a hydroxy group.

<Formula 6>

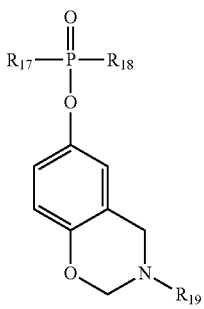

In Formula 6, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 6A below:

<Formula 6A>

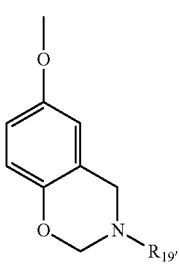

In Formulae 6 and 6A, $R_{19}$ and $R_{19'}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

The second electrolyte membrane may have a phosphoric acid-based material retention ratio of about 250% to about 310%. The first electrolyte membrane may have a phosphoric acid-based material retention ratio of about 400% to about 500%.

In some embodiments of the composite electrolyte membrane, the total of the phosphoric acid-based material retention ratios of the second electrolyte membrane, which is the core electrolyte membrane, and the first electrolyte membranes may be from about 800% to about 1000%.

The phosphoric acid-based material retention ratio of the second electrolyte membrane corresponds to that of a polymer of at least one selected from among the compounds represented by Formulae 5 and 6 above that forms the second electrolyte membrane. The phosphoric acid-based material retention ratio of the first electrolyte membrane corresponds to that of a polymer of at least one selected from among the compounds represented by Formulae 1 to 4 above that form the first electrolyte membrane.

When the phosphoric acid-based material retention ratios of the core electrolyte membrane and the first electrolyte membrane are within the above ranges, the phosphoric acid may be uniformly distributed over the composite electrolyte membrane, not leaking out of the same.

A composition containing at least one first compound selected from among the compounds of Formulae 1 to 4 above, and a composition containing at least one second compound selected from among the compounds of Formulae 5 to 6 above may each further include a cross-linkable compound.

A polymerization reaction product of the compositions described above may be a polymerization reaction product of the first compound or the second compound, or a polymerization reaction product of the first compound or second compound and a cross-linkable compound.

Examples of the compound of Formula 1 include compounds represented by Formulae 7 to 55.

<Formula 7>

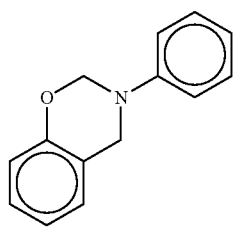

<Formula 8>

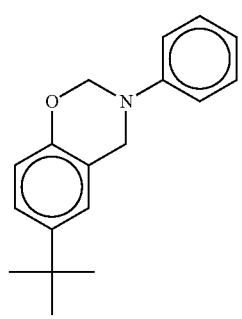

<Formula 9>

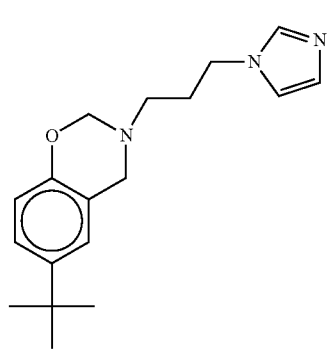

<Formula 10>

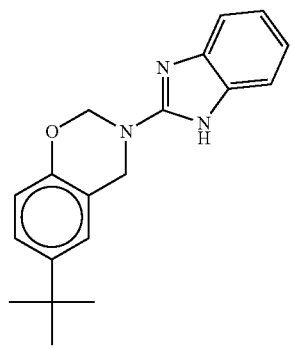

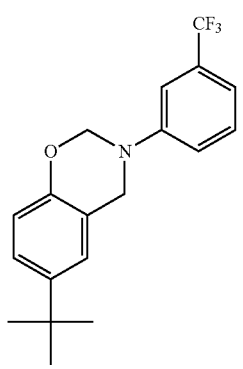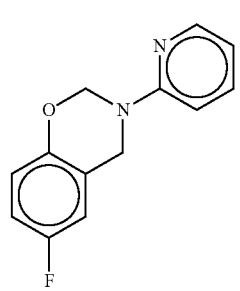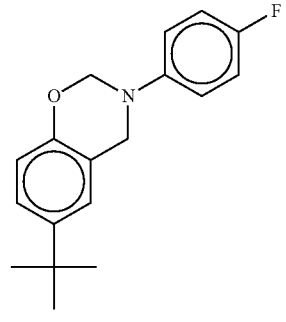

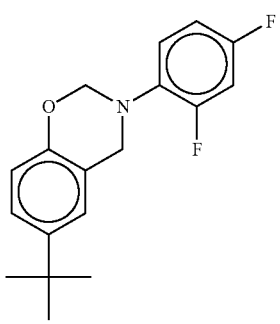
<Formula 21>
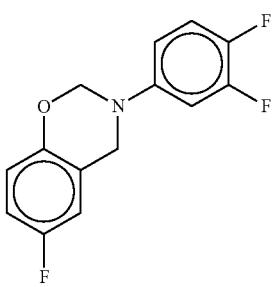
<Formula 26>
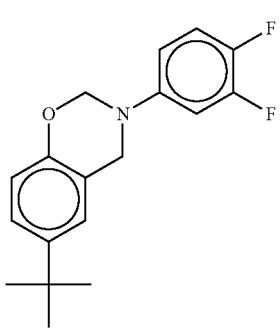
<Formula 22>
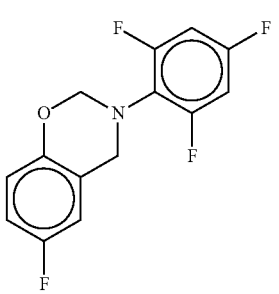
<Formula 27>
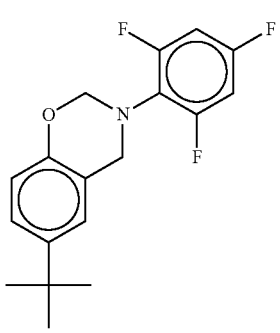
<Formula 23>
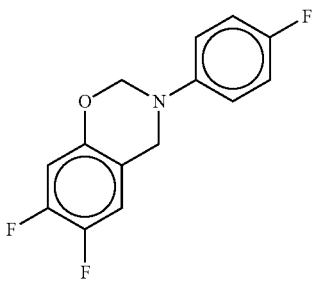
<Formula 28>
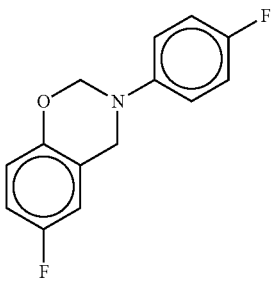
<Formula 24>
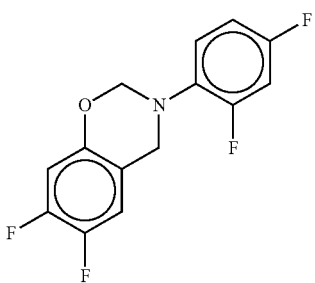
<Formula 29>
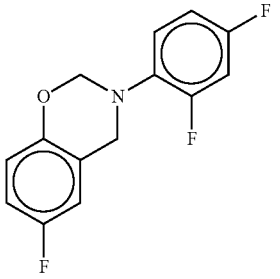
<Formula 25>
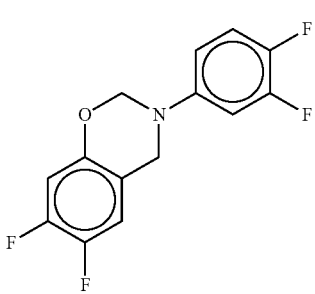
<Formula 30>

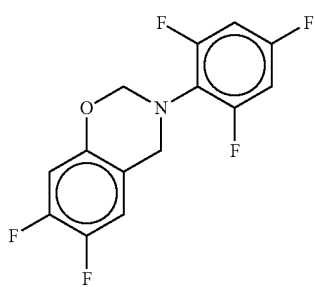
<Formula 31>
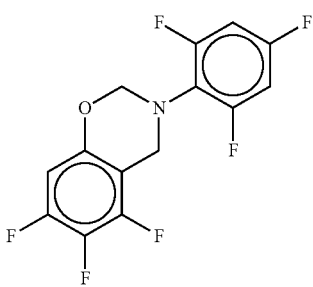
<Formula 36>
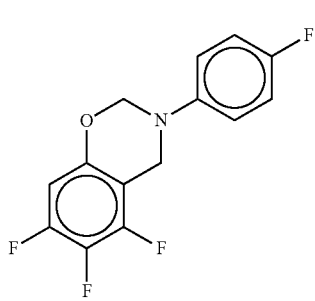
<Formula 32>
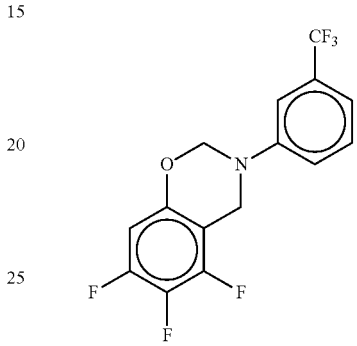
<Formula 37>
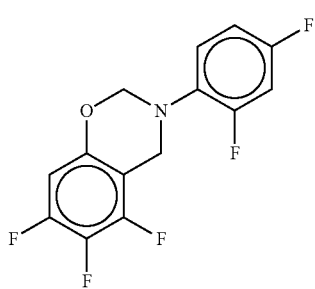
<Formula 33>
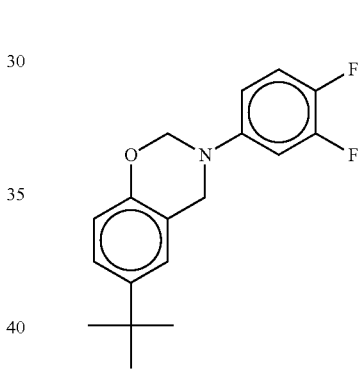
<Formula 38>
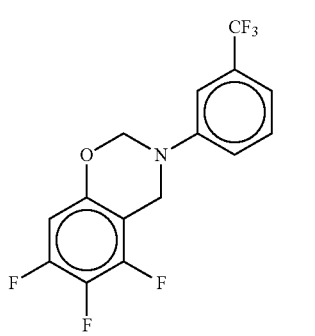
<Formula 34>
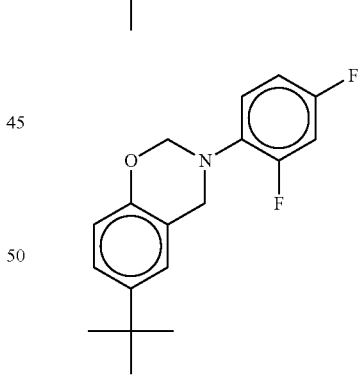
<Formula 39>
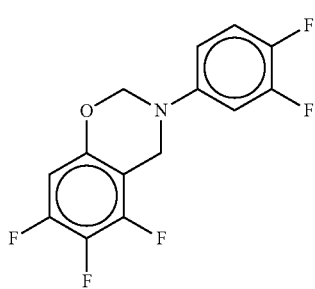
<Formula 35>
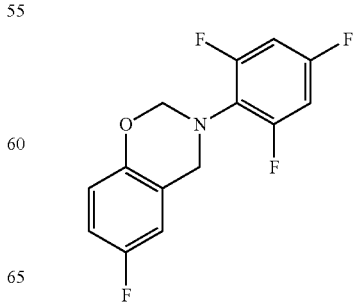
<Formula 40>

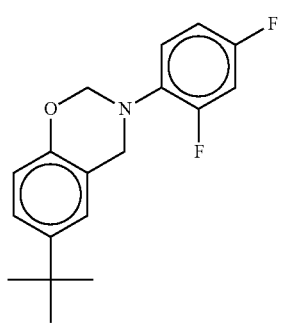
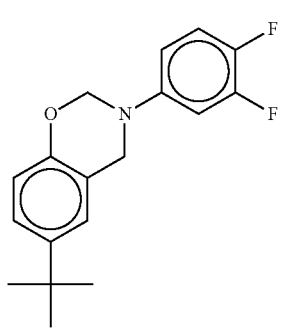
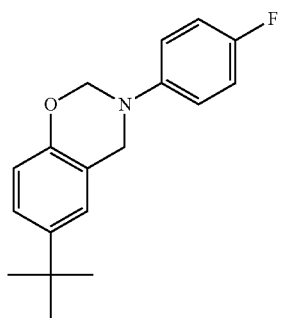
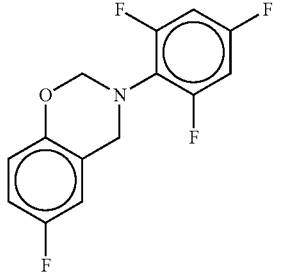
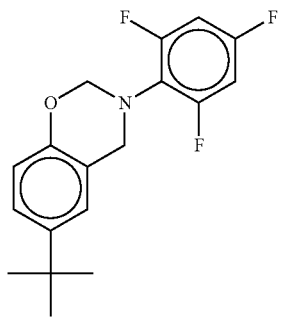
<Formula 41>
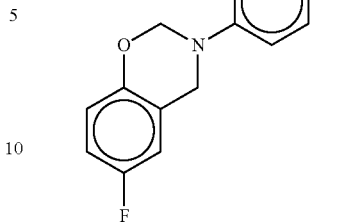
<Formula 42>
<Formula 43>
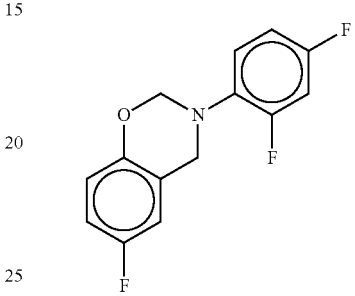
<Formula 44>
<Formula 45>
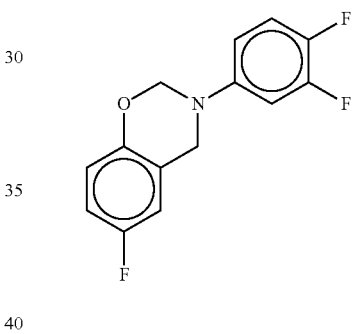
<Formula 46>
<Formula 47>
<Formula 48>
<Formula 49>
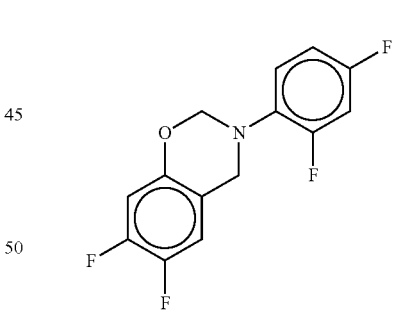
<Formula 50>
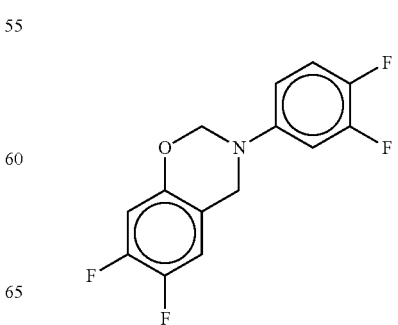

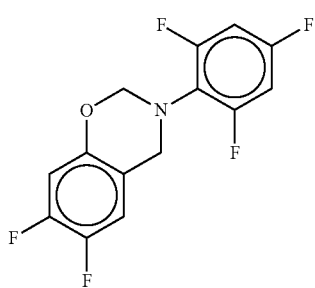
<Formula 51>
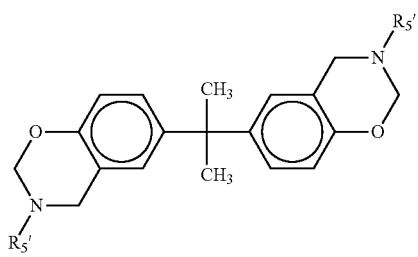
<Formula 56>
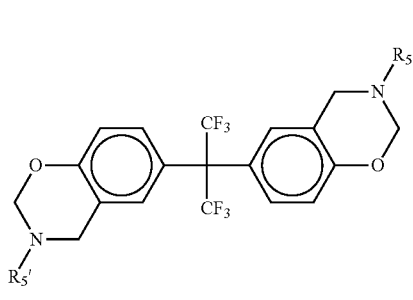
<Formula 57>
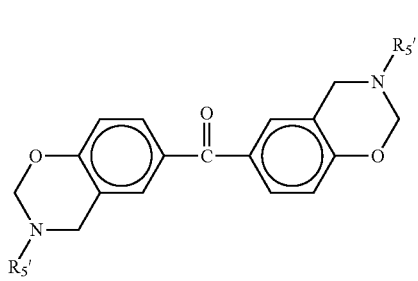
<Formula 58>
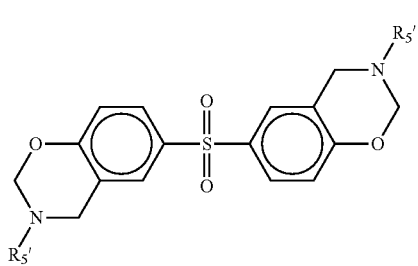
<Formula 59>
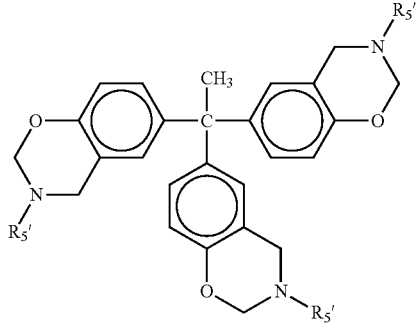
<Formula 60>
<Formula 52>
<Formula 53>
<Formula 54>
<Formula 55>
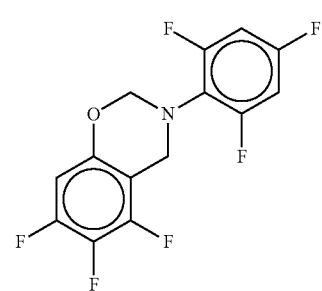
Examples of the compound of Formula 2 include compounds represented by Formulae 56 to 60 below.
In Formulae 56 to 60, $R_5$, is —$CH_2$—CH=$CH_2$ or a group represented by Formula 61 below.

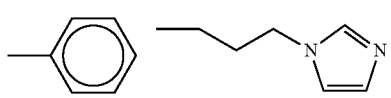
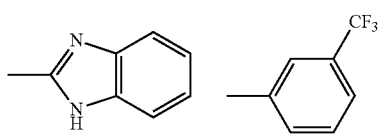
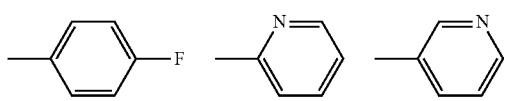
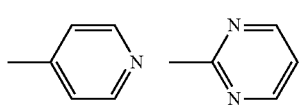
Examples of the compound of Formula 2 include compounds represented by Formulae 62 to 65 below.
<Formula 62>
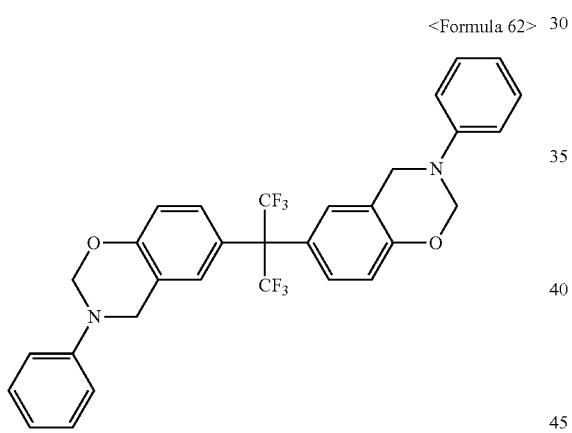
<Formula 63>
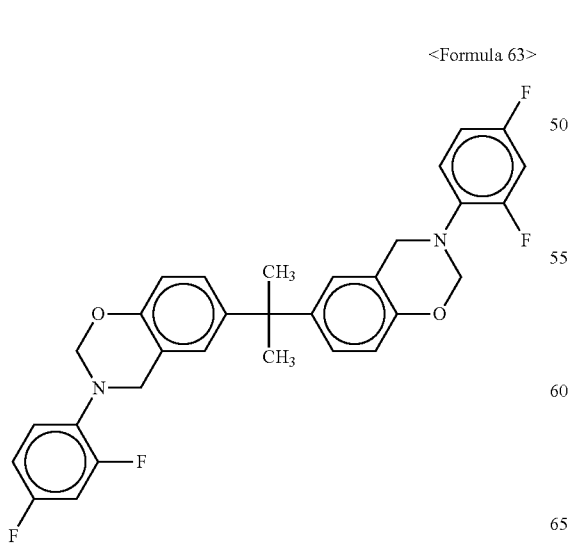
<Formula 64>
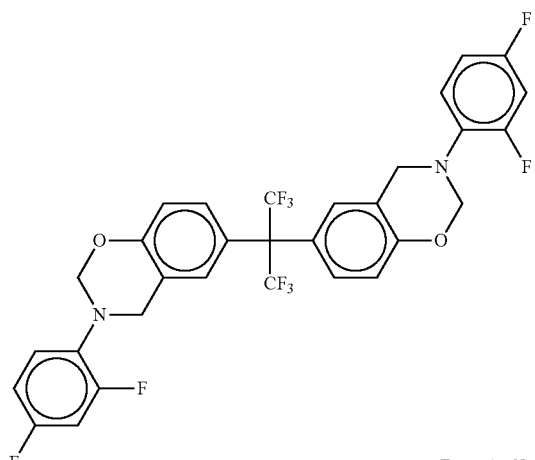
<Formula 65>
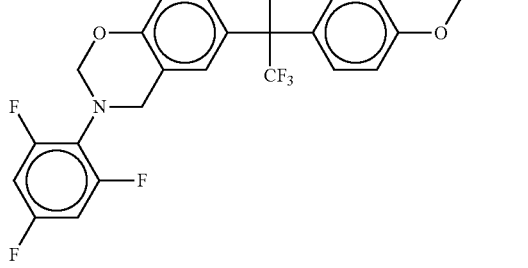
Examples of the compound of Formula 3 include compounds represented by Formulae 66 to 70 below:
<Formula 66>
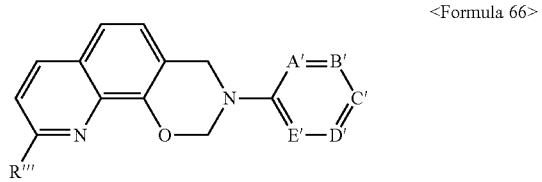
In Formula 66, R''' is a hydrogen atom or a $C_1$-$C_{10}$ alkyl group.
<Formula 67>
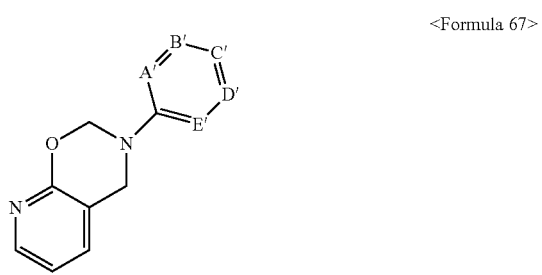

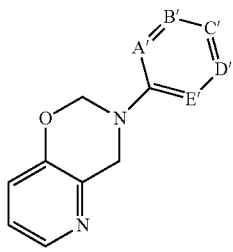
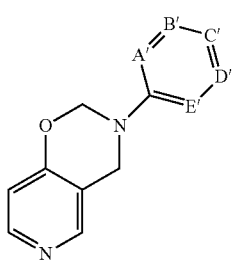
In Formulae 67 to 69,
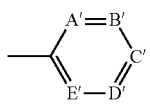
is selected from among groups presented by Formula 70 below.
<Formula 70>
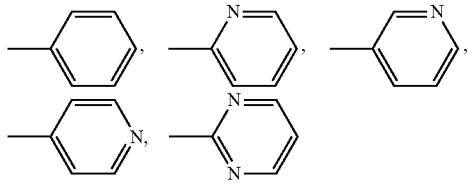
Non-limiting examples of the compound of Formula 3 include compounds represented by Formulae 71 to 91 below:
<Formula 71>
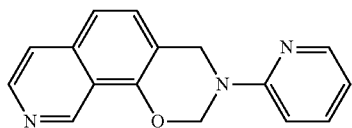
<Formula 72>
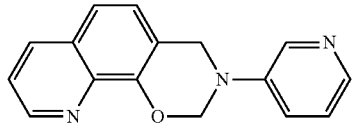
<Formula 73>
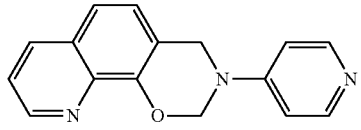
<Formula 74>
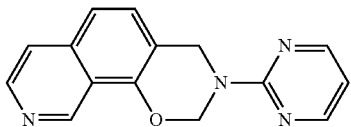
<Formula 75>
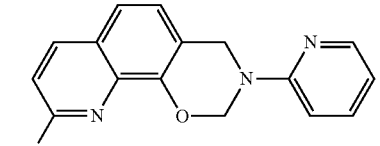
<Formula 76>
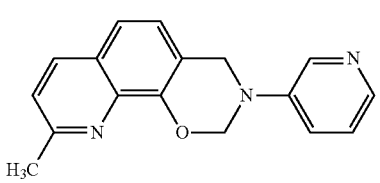
<Formula 77>
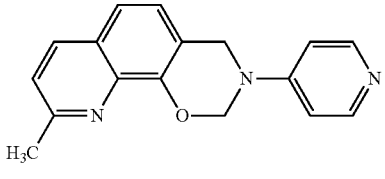
<Formula 78>
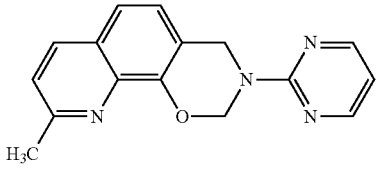
<Formula 79>
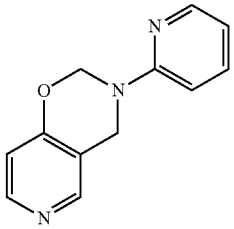
<Formula 80>
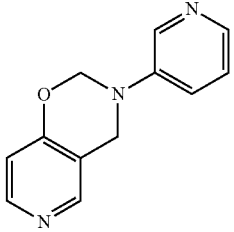
<Formula 81>
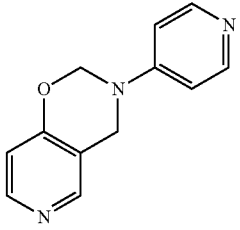

<Formula 82>
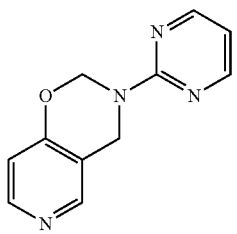

<Formula 83>
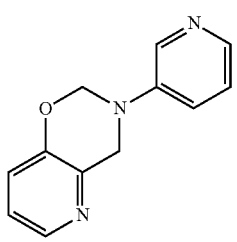

<Formula 84>
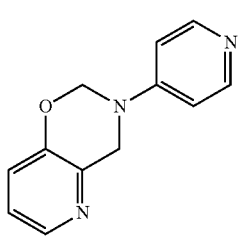

<Formula 85>
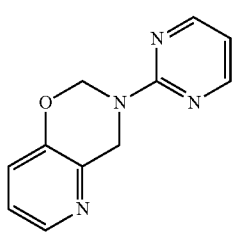

<Formula 86>
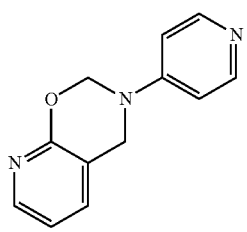

<Formula 87>
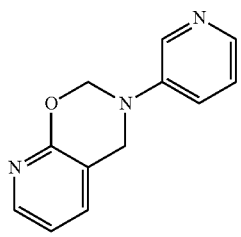

<Formula 88>
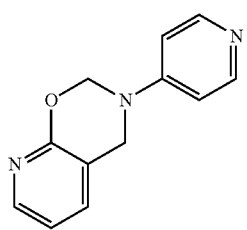

<Formula 89>
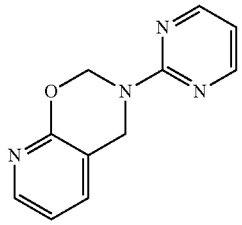

<Formula 90>
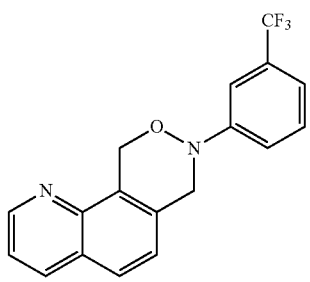

<Formula 91>
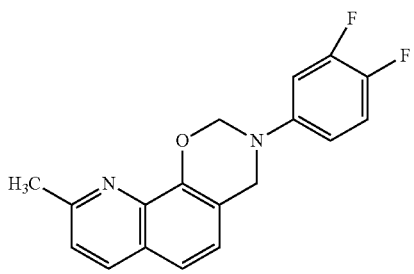

In the compound of Formula 5, A' may be a group represented by Formulae 92 or 93 below:

<Formula 92>
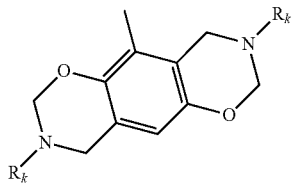

<Formula 93>
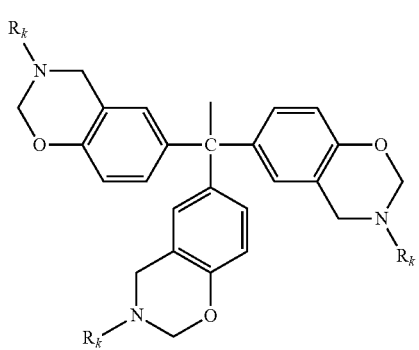

In Formulae 92 and 93, $R_k$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group.

Examples of the compound of Formula 5 include compounds represented by Formulae 94 and 95 below:

<Formula 94>

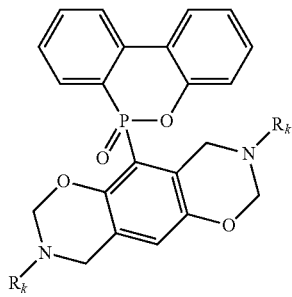

<Formula 95>

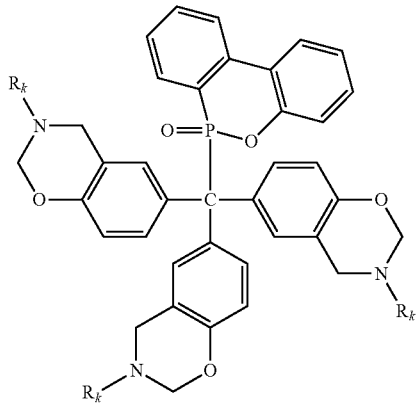

In Formula 94 and 95, $R_k$ is selected from among groups represented by Formula 96 below:

<Formula 96>

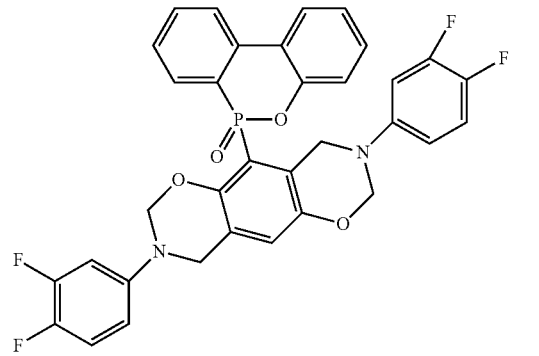

<Formula 97>

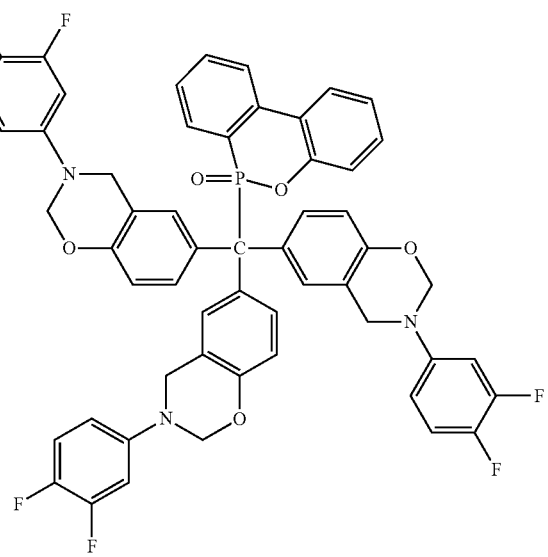

<Formula 98>

<Formula 99>

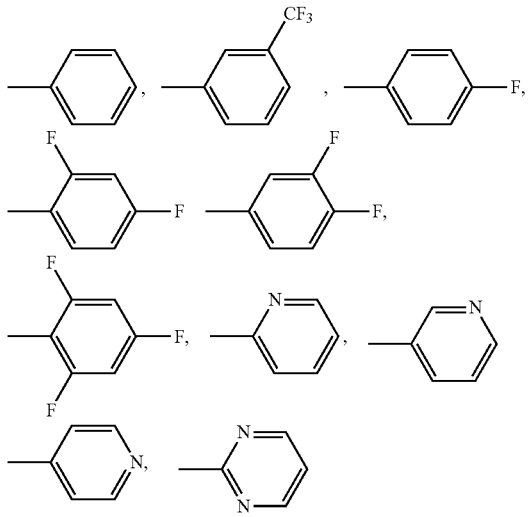

<Formula 99>

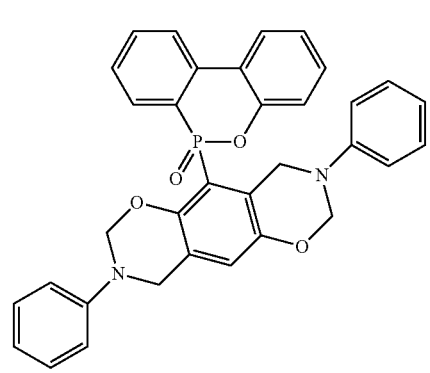

<Formula 100>

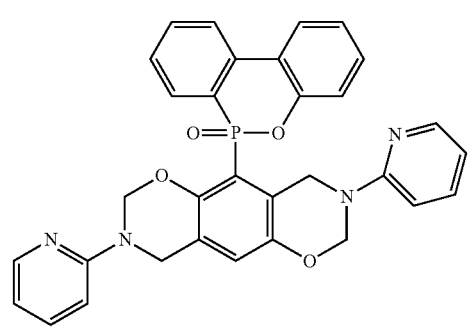

Examples of the compound of Formula 5 include compounds represented by Formulae 97 to 105 below:

-continued

<Formula 101>

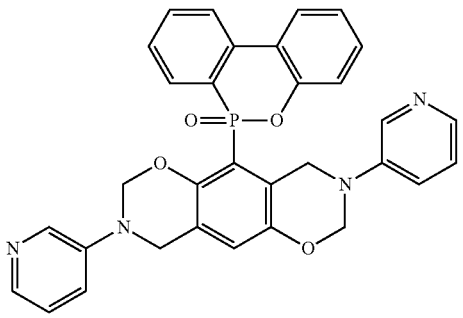

<Formula 102>

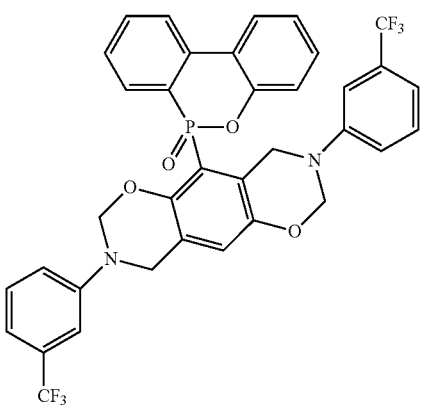

Examples of the compound of Formula 6 include compounds represented by Formulae 103, 104, and 106 below:

<Formula 103>

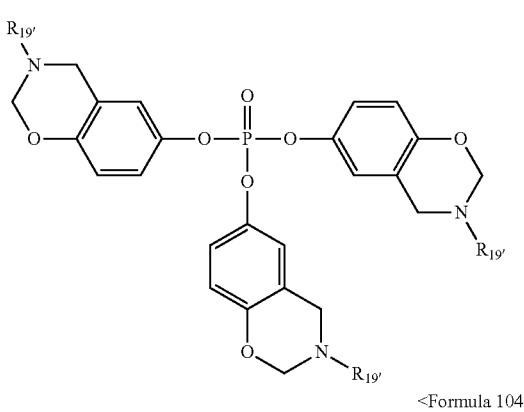

<Formula 104>

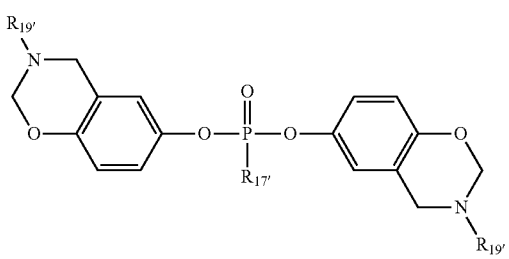

In Formulae 103 and 104, $R_{17}'$ is a $C_1$-$C_{10}$ alkyl group, a $C_1$-$C_{10}$ alkoxy group, a $C_6$-$C_{10}$ aryl group or a $C_6$-$C_{10}$ aryloxy group;

$R_{19}'$ is selected from among groups represented by Formula 105 below:

<Formula 105>

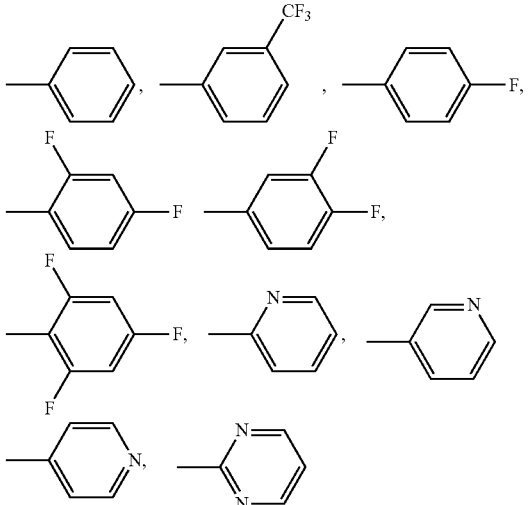

<Formula 106>

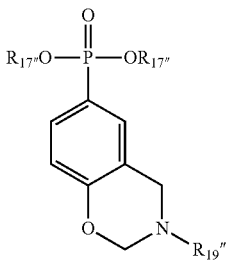

In Formula 106, $R_{17}''$ is a $C_6$-$C_{10}$ aryl group; and $R_{19}''$ is selected from groups represented by Formula 107 below:

<Formula 107>

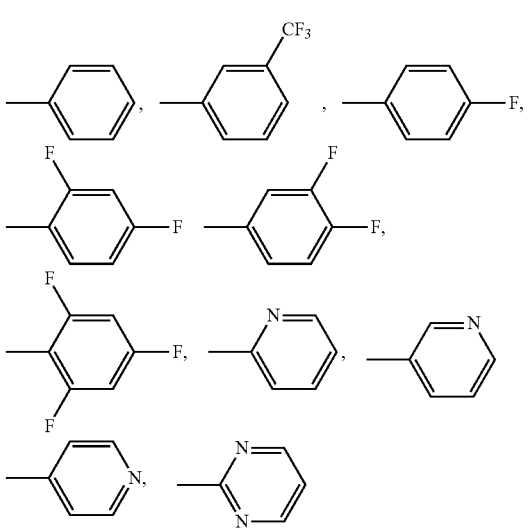

Examples of the compound of Formula 5 include compounds represented by Formulae 108 and 109.

<Formula 108>
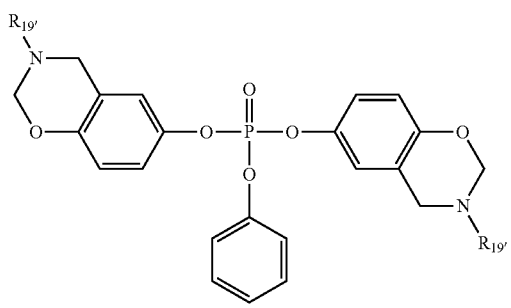
<Formula 109>
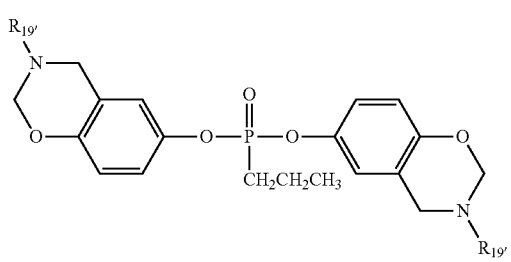
In Formulae 108 and 109, R$_{19}$' is selected from among groups represented by Formula 110 below:
<Formula 110>
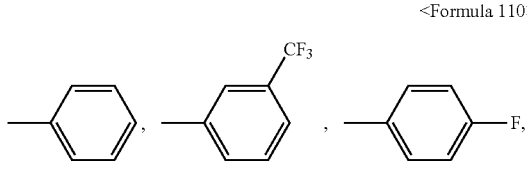
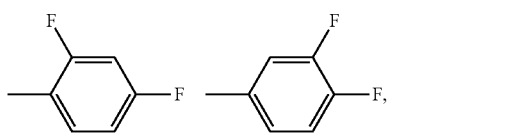
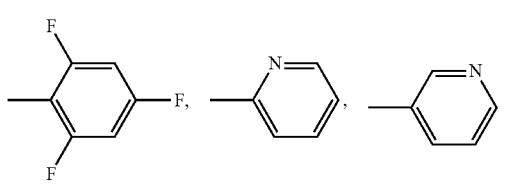
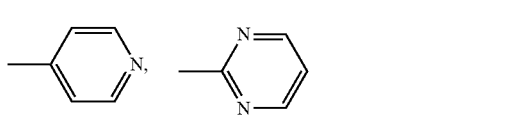
<Formula 111>
<Formula 112>
<Formula 113>
<Formula 114>
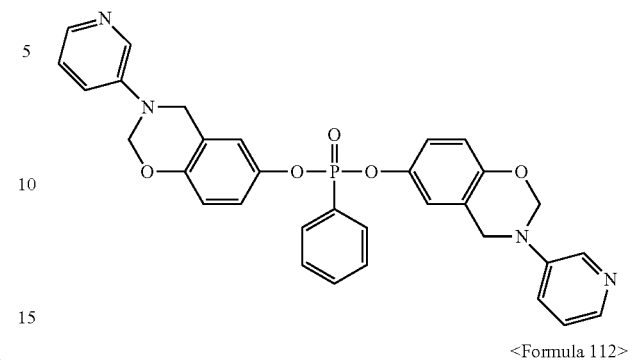
Examples of the compound of Formula 6 include compounds represented by Formulae III and 117 below:

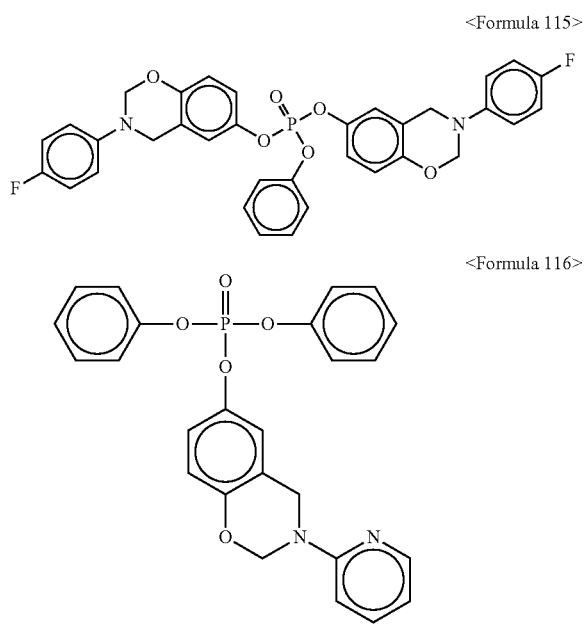
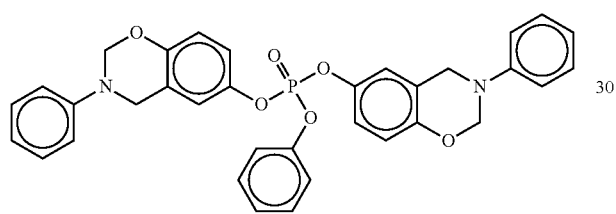
Examples of the compound of Formula 6 include compounds represented by Formulae 119 to 121 below.
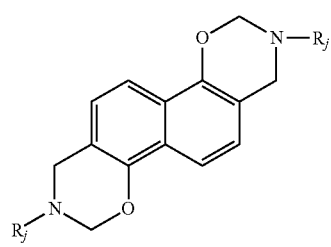
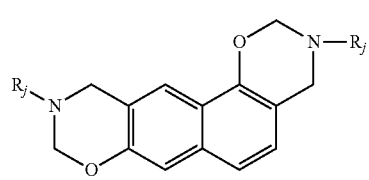
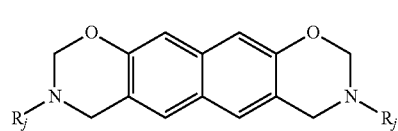
In Formulae 119 to 121, $R_j$ is selected from among groups represented by Formulae 121A below:
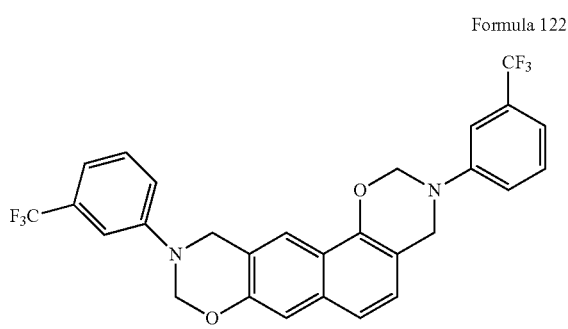
Examples of the compound of Formula 4 include compounds represented by Formulae 122 to 129 below.
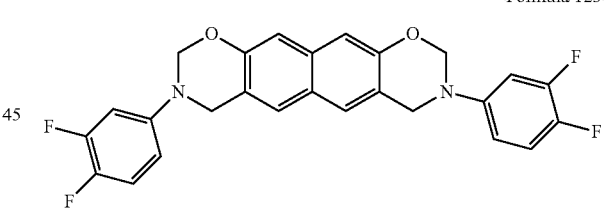
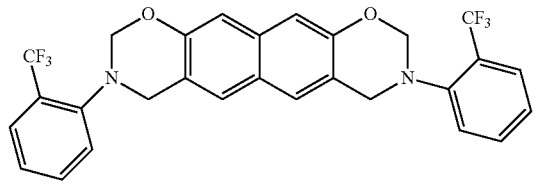
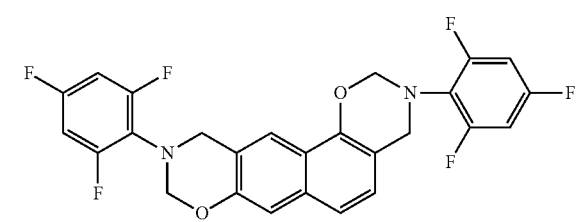

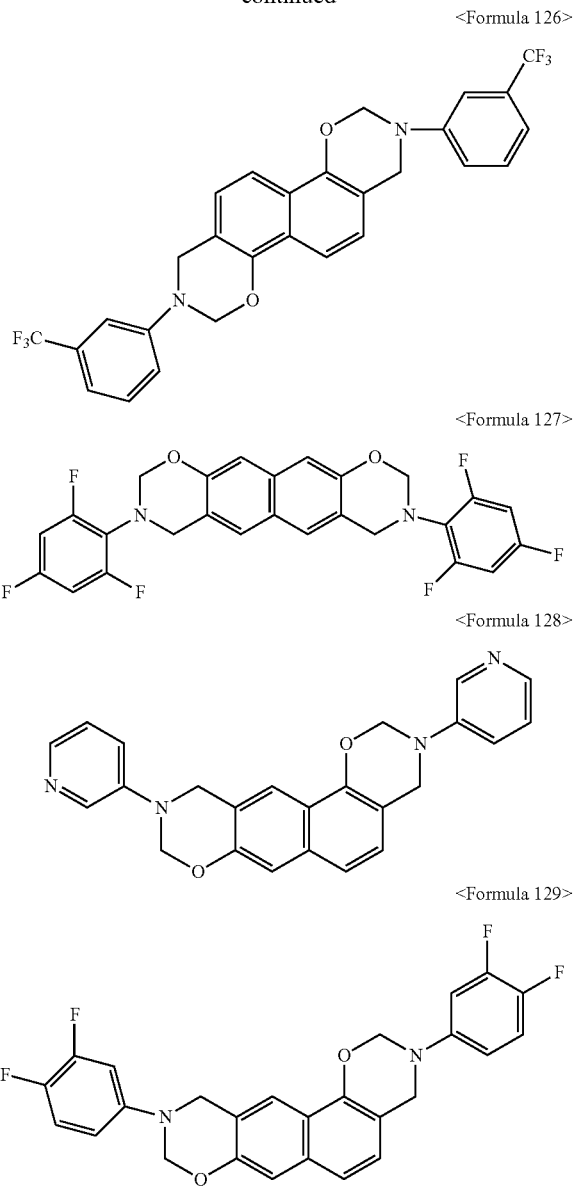

<Formula 126>
<Formula 127>
<Formula 128>
<Formula 129>

The cross-linkable compound may include any compound with a functional group that is cross-linkable with the first compound or the second compound.

Examples of the cross-linkable compound include any nitrogen-containing aromatic compound, including five-membered cyclic nitrogen-containing aromatic compounds, and six-membered cyclic nitrogen-containing aromatic compounds.

The cross-linkable compound may be at least one material selected from the group consisting of a polyazole-based material, polyoxazole and polyimide.

When a polyazole-based material is used as the cross-linkable compound, a final product may be a graft copolymer obtained through graft polymerization of the first compound and/or second compound with the polyazole-based material.

As used herein, the term "a polymerization product of the first compound and/or the second compound" may be used as the meaning of the graft copolymer described above.

The polyazole-based material indicates a polymer, a repeating unit of which includes at least one aryl ring having at least one nitrogen atom.

The aryl ring may be a five-membered or six-membered atom ring with one to three nitrogen atoms that may be fused to another ring, for example, another aryl ring or heteroaryl ring. In this regard, the nitrogen atoms may be substituted with an oxygen, phosphorus and/or sulfur atom. Examples of the aryl ring include phenyl, naphthyl, hexahydroindyl, indanyl, tetrahydronaphthyl, and the like.

The polyazole-based material may have at least one amino group in the repeating unit as described above. In this regard, the at least one amino group may be a primary, secondary or tertiary amino group as part of the aryl ring or substituent part of an aryl ring.

The term "amino group" indicates a group with a nitrogen atom covalently bonded to at least one carbon or hetero atom. The amino group may refer to, for example, —$NH_2$ and substituted moieties.

The term "alkylamino group" also refers to an "alkylamino group" with nitrogen bound to at least one additional alkyl group, and "arylamino" and "diarylamino" groups with at least one or two nitrogen atoms bound to a selected aryl group.

Methods of preparing the polyazole-based material and a polymer film including the polyazole-based material are disclosed in US 2005/256296.

Examples of the polyazole-based material include polyazole-based materials represented by Formulae 130 to 143 below.

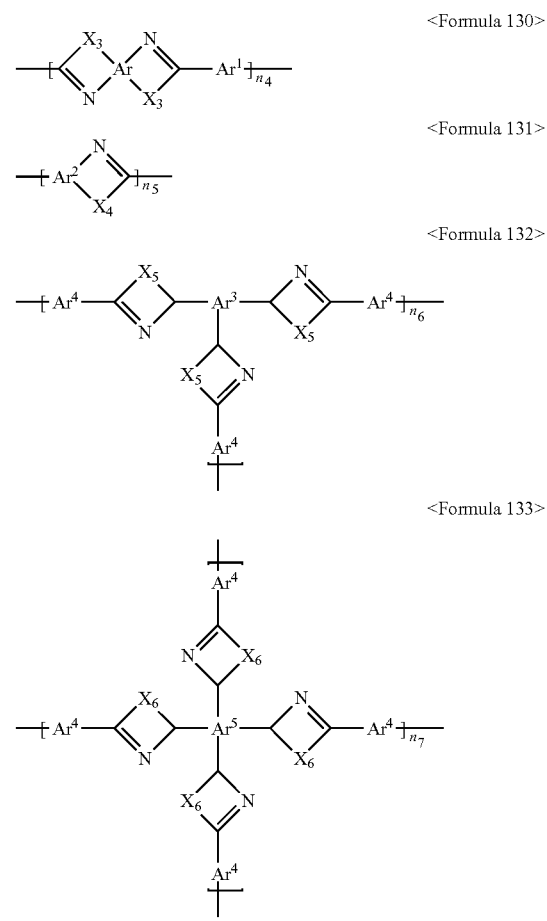

<Formula 130>
<Formula 131>
<Formula 132>
<Formula 133>

<Formula 134>
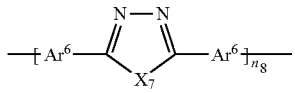

<Formula 135>
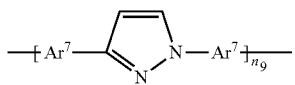

<Formula 136>
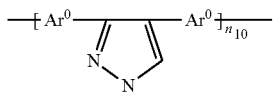

<Formula 137>
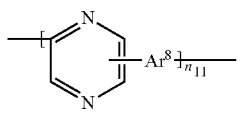

<Formula 138>
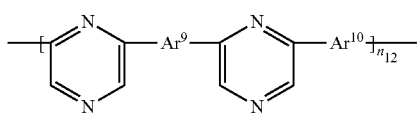

<Formula 139>
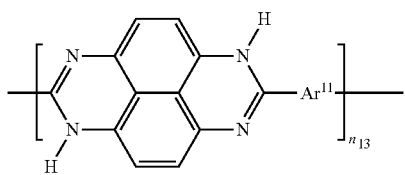

<Formula 140>
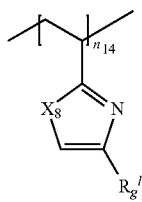

<Formula 141>
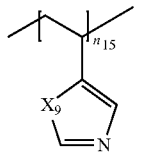

<Formula 142>
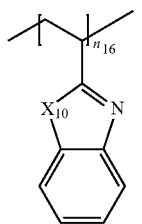

<Formula 143>
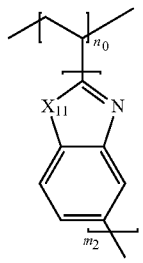

In Formulae 130 to 143, $Ar^0$ may be identical to or different from another $Ar^0$, or any other $Ar^n$ (where n can be no superscript or 1 to 11), and may be a tetravalent monocyclic or polycyclic $C_6$-$C_{20}$ aryl group or a $C_2$-$C_{20}$ heteroaryl group;

Ar may be identical to or different from another Ar, or any other $Ar^n$ (where n can be no superscript or 1 to 11), and may be a tetravalent monocyclic or polycyclic $C_6$-$C_{20}$ aryl group or a $C_2$-$C_{20}$ heteroaryl group;

$Ar^1$ may be identical to or different from another $Ar^1$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$Ar^2$ may be identical to or different from another $Ar^2$, or any other $Ar^n$ (where n can be no superscript or 1 to 11), and may be a bivalent or trivalent monocyclic or polycyclic $C_6$-$C_{20}$ aryl group or a $C_2$-$C_{20}$ heteroaryl group;

$Ar^3$ may be identical to or different from another $Ar^3$, or any other $Ar^n$ (where n can be no superscript or 1 to 11), and may be a trivalent monocyclic or polycyclic $C_6$-$C_{20}$ aryl group or a $C_2$-$C_{20}$ heteroaryl group;

$Ar^4$ may be identical to or different from another $Ar^4$, or any other $Ar^n$ (where n can be no superscript or 1 to 11), and may be a trivalent monocyclic or polycyclic $C_6$-$C_{20}$ aryl group or a $C_2$-$C_{20}$ heteroaryl group;

$Ar^5$ may be identical to or different from another $Ar^5$, or any other $Ar^n$ (where n can be no superscript or 1 to 11), and may be a tetravalent monocyclic or polycyclic $C_6$-$C_{20}$ aryl group or a $C_2$-$C_{20}$ heteroaryl group;

$Ar^6$ may be identical to or different from another $Ar^6$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$Ar^7$ may be identical to or different from another $Ar^7$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$Ar^8$ may be identical to or different from another $Ar^8$, or any other $Ar^n$ (where n can be no superscript or 1 to 11), and may be a trivalent monocyclic or polycyclic $C_6$-$C_{20}$ aryl group or a $C_2$-$C_{20}$ heteroaryl group;

$Ar^9$ may be identical to or different from another $Ar^9$, or any other $Ar^n$ (where n can be no superscript or 1 to 11), and may be a bivalent, trivalent or tetravalent monocyclic or polycyclic $C_6$-$C_{20}$ aryl group or a $C_2$-$C_{20}$ heteroaryl group;

$Ar^{10}$ may be identical to or different from another $Ar^{10}$, or any other $Ar^n$ (where n can be no superscript or 1 to 11), and may be a bivalent or trivalent monocyclic or polycyclic $C_6$-$C_{20}$ aryl group or a $C_2$-$C_{20}$ heteroaryl group;

$Ar^{11}$ may be identical to or different from another $Ar^{11}$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$X_3$ to $X_{11}$ may be identical to or different from another $X_n$ (where n can be a superscript from 3 to 11), and may be an oxygen atom, a sulfur atom or —N(R'); and R' may be a hydrogen atom, a $C_1$-$C_{20}$ alkyl group, a $C_1$-$C_{20}$ alkoxy group or a $C_6$-$C_{20}$ aryl group;

$R_9'$ may be identical to or different from another $R_9'$, and may be a hydrogen atom, a $C_1$-$C_{20}$ alkyl group or a $C_6$-$C_{20}$ aryl group; and $n_0$, $n_4$ to $n_{16}$, and $m_2$ may each be independently an integer of 10 or greater, and in some embodiments, may be each an integer of 100 or greater, and in some other embodiments, may be each an integer of 100 to 100,000.

Examples of the aryl or heteroaryl group include benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiazole, benzoxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene, wherein these aryl or heteroaryl groups may have a substituent.

Ar, $Ar^0$, $Ar^1$, $Ar^4$, $Ar^6$, $Ar^7$, $Ar^8$, $Ar^9$, $Ar^{10}$, and $Ar^{11}$ defined above may have any substitutable pattern. For example, if the aryl or heteroaryl group is phenylene, Ar, $Ar^0$, $Ar^1$, $Ar^4$, $Ar^6$, $Ar^7$, $Ar^8$, $Ar^9$, $Ar^{10}$ and $Ar^{11}$ may be ortho-phenylene, meta-phenylene, or para-phenylene.

The alkyl group may be a $C_1$-$C_4$ short-chain alkyl group, such as methyl, ethyl, n-propyl, i-propyl or t-butyl. The aryl group may be, for example, a phenyl group or a naphthyl group.

Examples of the substituent include a halogen atom, such as fluorine, an amino group, a hydroxyl group, and a short-chain alkyl group, such as methyl or ethyl.

Examples of the polyazole-based material include polyimidazole, polybenzothiazole, polybenzoxazole, polyoxadiazole, polyquinoxaline, polythiadiazole, polypyridine, polypyrimidine, and polytetrazapyrene.

The polyazole-based material may include a copolymer or blend including at least two units selected from the group consisting of units represented by Formulae 130 to 143 above. The polyazole-based material may include a block copolymer (di-block or tri-block), a random copolymer, a periodic copolymer or an alternating polymer including at least two units selected from the units of Formulae 130 to 143.

In some embodiments, the polyazole-based material may include only at least one of the units represented by Formulae 130 and 131.

Examples of the polyazole-based material include polymers represented by Formulae 144 to 170 below:

<Formula 144>

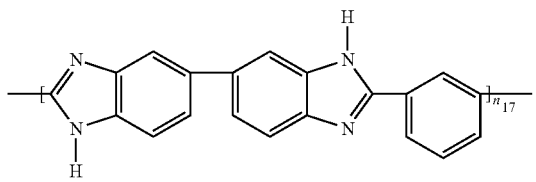

<Formula 145>

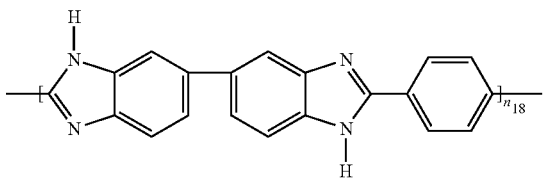

<Formula 146>

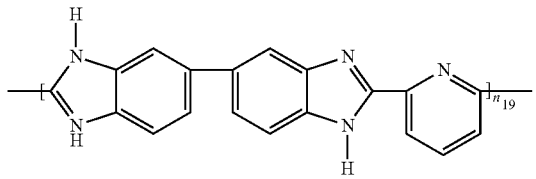

<Formula 147>

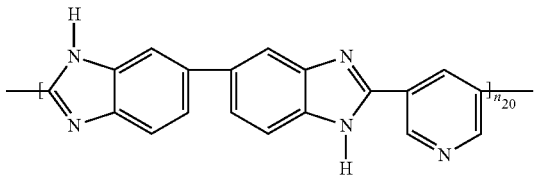

<Formula 148>

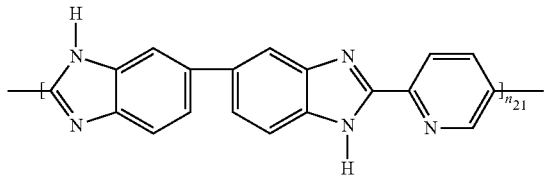

<Formula 149>

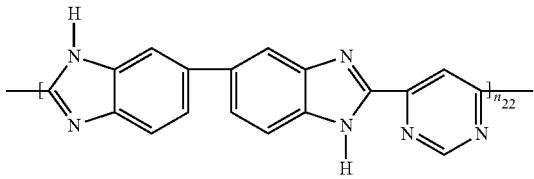

<Formula 150>

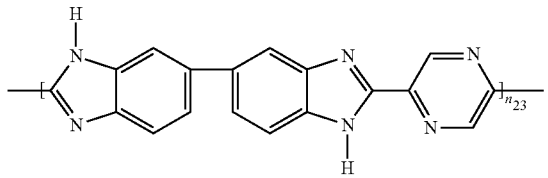

<Formula 151>

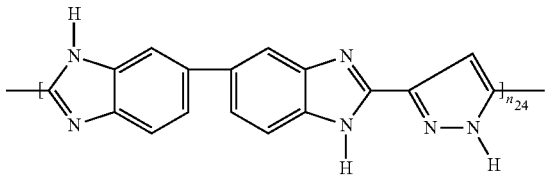

-continued
<Formula 152>
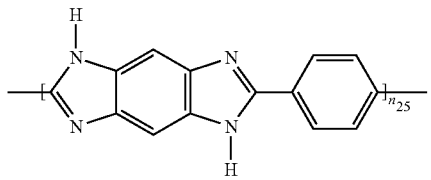
<Formula 153>
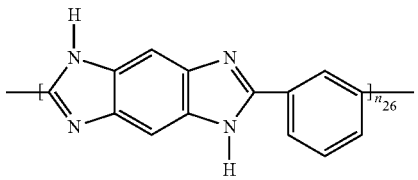
<Formula 154>
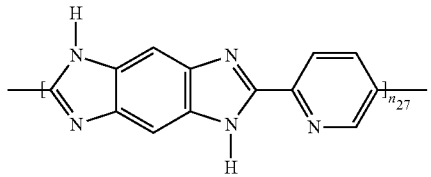
<Formula 155>
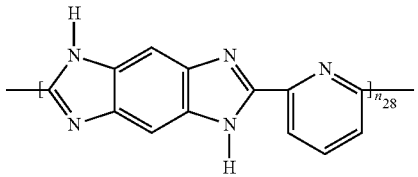
<Formula 156>
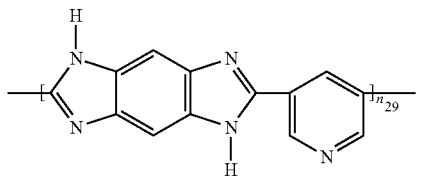
<Formula 157>
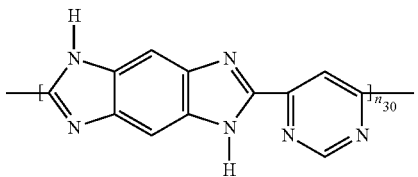
<Formula 158>
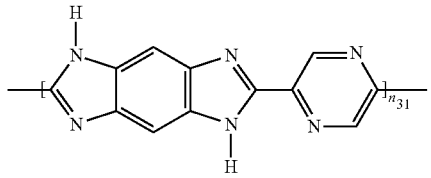
<Formula 159>
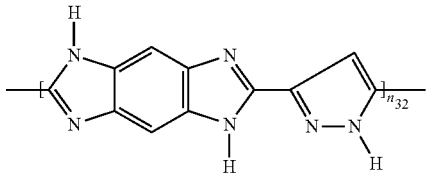
<Formula 160>
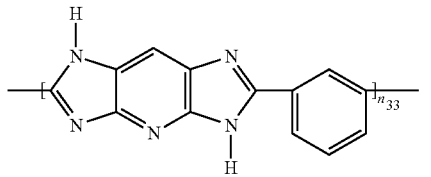
<Formula 161>
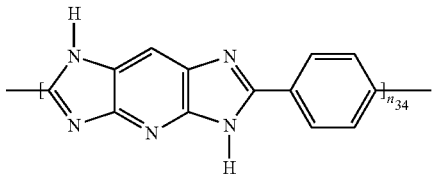
<Formula 162>
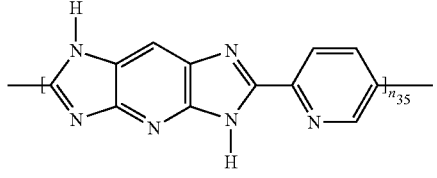
<Formula 163>
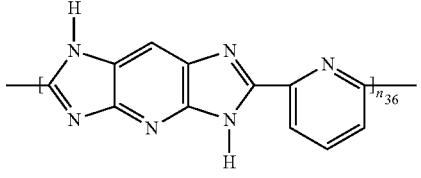
<Formula 164>
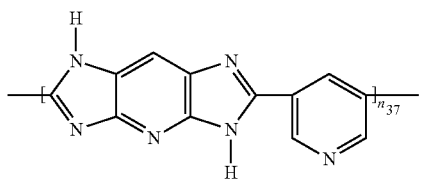
<Formula 165>
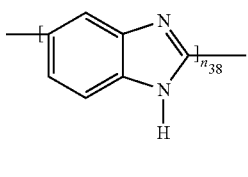
<Formula 166>
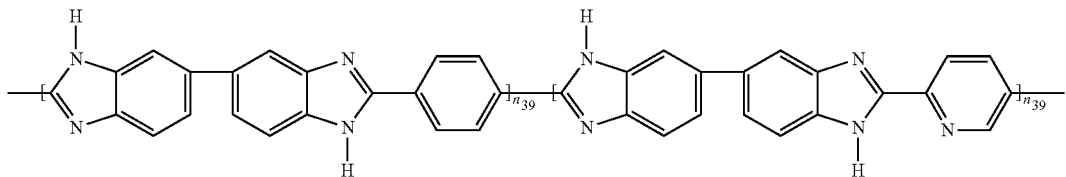

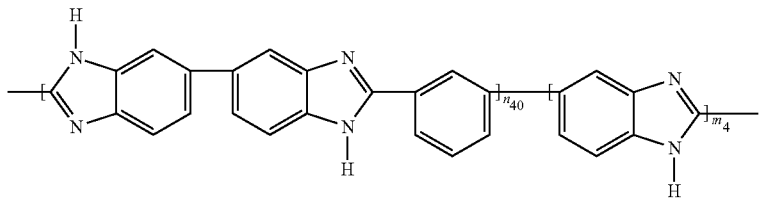

<Formula 167>

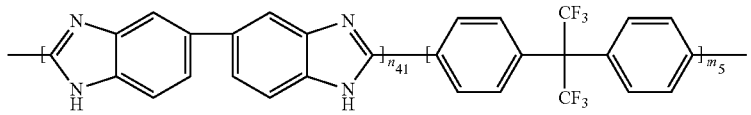

<Formula 168>

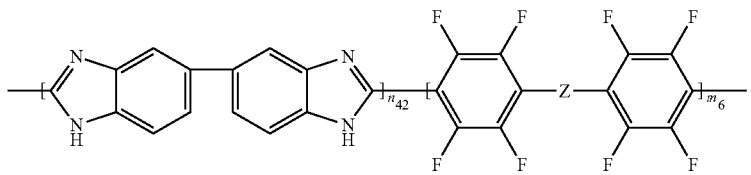

<Formula 169>

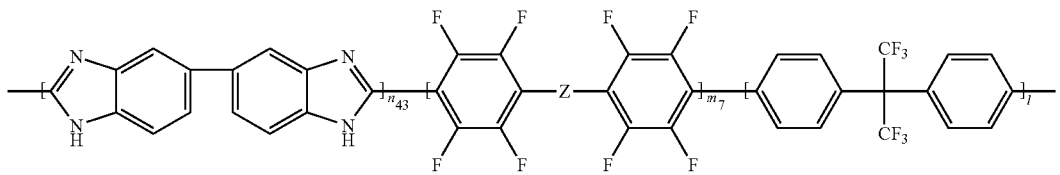

<Formula 170>

In Formulae 144 to 170, l, $n_{17}$ to $n_{43}$, and $m_3$ to $m_7$ may be each an integer of 10 or greater, and in some embodiments, may be an integer of 100 or greater, z may be a chemical bond, $-(CH_2)_S-$, $-C(=O)-$, $-SO_2-$, $-C(CH_3)_2-$, or $-C(CF_3)_2-$; and s may be an integer from 1 to 5.

The polyazole-based material may include a compound (m-polybenzimidazole, m-PBI) represented by Formula 171 below, or compound (p-PBI) represented by Formula 172 below.

<Formula 171>

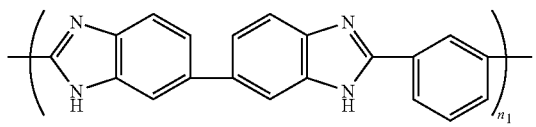

In Formula 171, $n_1$ is an integer of 10 or greater;

<Formula 172>

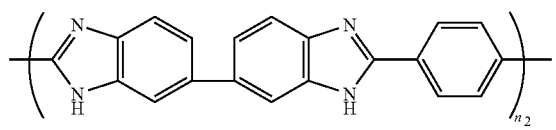

In Formula 172, $n_2$ may be an integer of 10 or greater, and in some embodiments, may be an integer of 100 or greater. These polymeric compounds may have a number average molecular weight of 1,000,000 or less.

For example, the polyazole-based material may be a polymer represented by Formula 173 below.

<Formula 173>

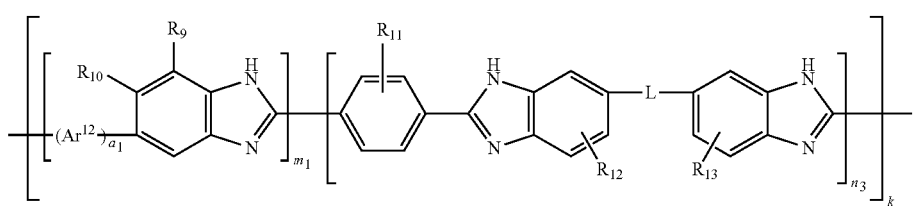

In Formula 173, $R_9$, and $R_{10}$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, wherein $R_9$ and $R_{10}$ may be linked to form a $C_4$-$C_{20}$ carbon ring or a $C_3$-$C_{20}$ hetero ring, $Ar^{12}$ is a substituted or unsubstituted $C_6$-$C_{20}$ arylene group or a substituted or unsubstituted $C_3$-$C_{20}$ heteroarylene group;

$R_{11}$ to $R_{13}$ are each independently a mono or a multi-substituted substituent selected from the group consisting of a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_6$-$C_{20}$ heteroaryl group, and a substituted or unsubstituted $C_3$-$C_{20}$ heteroaryloxy group.

L represents a linker;
$m_1$ is from 0.01 to 1;
$a_1$ is 0 or 1;
$n_3$ is a number from 0 to 0.99; and
k is a number from 10 to 250.

The benzimidazole-based polymer may include a compound represented by Formula 174 below or a compound represented by Formula 175 below:

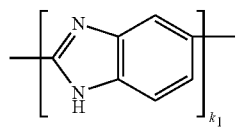

<Formula 174>

In Formula 174, $k_1$ represents the degree of polymerization and is a number from 10 to 300.

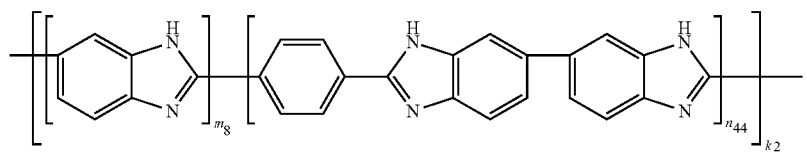

<Formula 175>

In Formula 175, $m_8$ is a number from 0.01 to 1, and in some embodiments, may be a number from 1 or a number from 0.1 to 0.9; and $n_{44}$ is a number from 0 to 0.99, and in some embodiments, may be 0 or a number from 0.1 to 0.9; and $k_2$ is a number from 10 to 250.

When at least one of the first and second compounds is polymerized with a polyazole-based compound, the amount of the cross-linkable compound may be from about 5 parts to about 210 parts by weight, and in some embodiments, may be from about 40 parts to about 210 parts by weight, based on 100 parts by weight of the at least one of the first and second compounds.

When the amount of the cross-linkable compound is within these ranges, proton conductivity of the composite electrolyte membrane may be high.

The second electrolyte membrane may have a single-layered structure or a multi-layered structure, for example, a 3-layer structure with the second electrolyte membrane disposed between the first electrolyte membranes forming a sequential stack of the first/second/first electrolyte membrane.

When the core electrolyte membrane has a multi-layered structure, the core electrolyte membrane may further include, in addition to the second electrolyte membrane, a plurality of electrolyte membranes containing a polymer of at least one selected from among the compounds of Formulae 1 to 4.

The thickness ratio of the first electrolyte membrane to the core electrolyte membrane may be from about 0.1:1 to about 4:1, and in some embodiments, may be about 2:4. When the core electrolyte membrane is a single-layered second electrolyte membrane, the thickness ratio of the first electrolyte membrane to the core electrolyte membrane may be about 20:40, and in another embodiment, may be about 40:40.

The first electrolyte membrane may have a thickness of about 5 μm to about 20 μm, and in some embodiments, may have a thickness of about 10 μm to about 15 μm. In another embodiment, the first electrolyte membrane may have a thickness of about 10 μm.

The core electrolyte membrane may have a thickness in total of from about 20 μm to about 80 μm, and in some embodiments, may have a thickness in total of from about 30 μm to about 50 μm. In another embodiment, the core electrolyte membrane may have a thickness in total of about 40 μm.

When the core electrolyte membrane is a single-layered second electrolyte membrane, the second electrolyte membrane may have a thickness of about 10 μm to about 90 μm, and in some embodiments, may have a thickness of about 30 μm to about 50 μm. In another embodiment, the second electrolyte membrane may have a thickness of about 40 μm.

When the thickness of the first electrolyte membrane and the core electrolyte membrane are within these ranges, they may have improved phosphoric acid retention without a reduction in mechanical strength, so that a fuel cell with improved lifetime characteristics may be manufactured.

The composite electrolyte membrane may be manufactured through a continuous coating process. Due to the materials forming the electrolyte membranes that exhibit strong binding force by hydrogen bonding, the core electrolyte membrane and the first electrolyte membrane may have good interfacial characteristics without an interfacial separation. When the composite electrolyte membrane is impregnated with phosphoric acid, absorption of the phosphoric acid into the electrolyte membrane may be facilitated due to improved contact surface characteristics, and at the same time, the electrolyte membrane may have an improved ability to retain the phosphoric acid absorbed through the first electrolyte membranes.

The core electrolyte membrane disposed in the middle of the composite electrolyte membrane may hinder propagation of defects that are likely to occur with formation of an electrolyte membrane, thereby improving long-term durability of the composite electrolyte membrane. The composite electrolyte membrane may have high mechanical strength and conductivity.

Therefore, a fuel cell with improved lifetime characteristics may be manufactured using the above-described composite electrolyte membrane.

FIG. 1 schematically illustrates the structure of a composite electrolyte membrane according to an embodiment of the present disclosure. Referring to FIG. 1, a single-layered second electrolyte membrane as a core electrolyte membrane is disposed on a first electrolyte membrane, and another first electrolyte membrane is disposed on the second electrolyte membrane.

The composite electrolyte membrane may have any multi-layered structure, including a 3-layer structure, wherein the second electrolyte membrane is disposed between the first electrolyte membranes forming a sequential stack of the first/second/first electrolyte membrane.

In an embodiment, the first electrolyte membrane may include a polymer that is a polymerization product of a compound represented by Formula 8 below and polybenzimidazole.

<Formula 8>

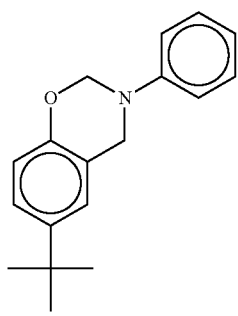

The second electrolyte membrane may include a polymer that is a polymerization product of a composition containing a compound represented by Formula 114 below and polybenzimidazole.

<Formula 114>

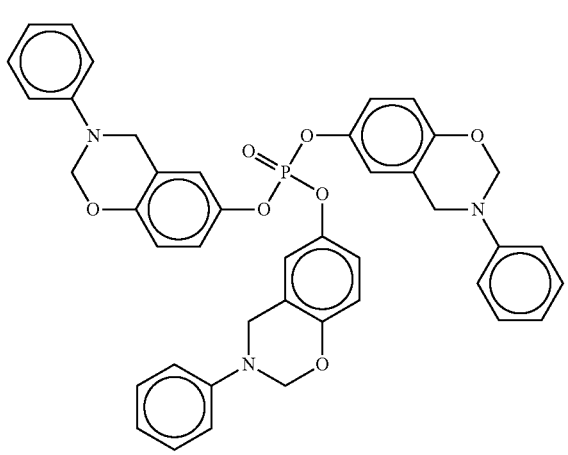

The polyazole-based material may include a compound (m-PBI) represented by Formula 171 below, or a compound (p-PBI) represented by Formula 172 below.

<Formula 171>

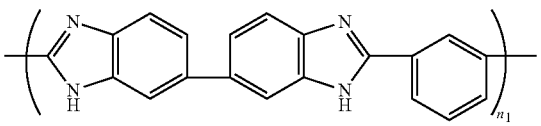

In Formula 171, $n_1$ is an integer of 10 or greater;

<Formula 172>

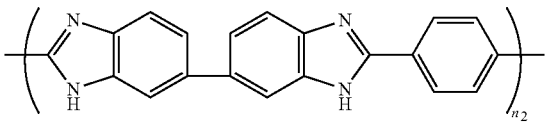

In Formula 172, $n_2$ is an integer of 10 or greater, and in some embodiments, may be an integer of 100 or greater.

The compounds of Formulae 171 and 172 may each have a number average molecular weight of 1,000,000 or less.

Hereinafter, a method of fabricating a composite electrolyte membrane according to an embodiment of the disclosure will now be described in detail. A composite electrolyte membrane may be fabricated using either one of the following two methods, which are non-limiting examples.

According to a first method, a composition including a compound having a phosphoric acid-based material-containing functional group and a first solvent is coated on opposite surfaces of a core electrolyte membrane and then thermally treated to form first electrolytes on the surfaces of the core electrolyte membrane. A cross-linkable compound may be further added to the composition. The kinds and amounts of the cross-linkable compound are the same as those described above.

The core electrolyte membrane may be formed through two steps: coating a substrate with a composition including at least one second compound selected from between a compound of Formula 5 and a compound of Formula 6, and a second solvent to form a second electrolyte membrane; and separating the second electrolyte membrane from the substrate.

According to a second method, a compound having a phosphoric acid-based material-containing functional group and a first solvent are mixed together to prepare a composition.

A cross-linkable compound may be further added into the composition.

A substrate is coated with the composition and is then thermally treated to obtain a first electrolyte membrane.

The compound having a phosphoric acid-based material-containing functional group may be at least one first compound selected from among the compounds of Formulae 1 to 4 above.

A composition including at least one second compound selected from the compounds of Formulae 5 and 6 and a second solvent is coated on a surface of the first electrolyte membrane and is then thermally treated to form a second electrolyte membrane. A cross-linkable compound may be further added into the composition.

A first electrolyte forming composition including a compound having a phosphoric acid-based material-containing functional group and a first solvent is coated on the second electrolyte membrane and is then thermally treated to form another first electrolyte membrane.

Afterward, a stacked structure of the first electrolyte membrane, the second electrolyte membrane and the first electrolyte membrane sequentially stacked in this order is separated from the substrate, thereby completing the manufacture of the composite electrolyte membrane.

In the first and second fabrication methods, examples of the first solvent or the second solvent include N-methylpyrrolidone, N,N'-dimethylacetamide, N,N'-dimethylformamide, and dimethylsulfoxide.

The amount of the first solvent may be from about 100 parts by weight to about 2000 parts by weight based on 100 parts by weight of the compound having a phosphoric acid-based material-containing functional group.

The amount of the second solvent may be from about 100 parts by weight to about 2000 parts by weight based on 100 parts by weight of the second compound.

When the amount of the first solvent and the second solvent are within these ranges, the core electrolyte membrane and the first electrolyte membranes may be readily formed to be uniform.

The substrate may be a glass substrate, a biaxially-oriented polyester film, or the like.

The thermal treatment may be performed at a temperature of about 80 to about 250° C.

The thermal treatment time varies depending on the thermal treatment temperature. In some embodiments the thermal treatment time may be from about 5 minutes to about 14 hours.

Methods of separating the composite electrolyte membrane from the substrate are not specifically limited. For example, a substrate with the composite electrolyte membrane may be immersed in hot water for about 1 hour to separate the composite electrolyte membrane in film form from the substrate such as a glass substrate. After a resulting product from the thermal treatment is cooled to room temperature (for example, about 20-25° C.), the composite electrolyte membrane in film form may be separated from the substrate and is then vacuum-dried, thereby completing the formation of the composite electrolyte membrane for a fuel cell.

As another example of separating the composite electrolyte membrane from the substrate, while impregnated with a phosphoric acid-based material at a predetermined temperature for a predetermined time, the composite electrolyte membrane in film form may be separated from the substrate and then vacuum-dried.

The composite electrolyte membrane may further include a proton conductor.

Examples of the proton conductor include polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof.

The concentration of the proton conductor may be from about 80 wt % to about 98 wt %, and in some embodiments, may be 80 wt %, 90 wt %, 95 wt %, or 98 wt %.

According to an embodiment of the present disclosure, a method of manufacturing a fuel cell by using any of the composite electrolyte membranes for fuel cells according to the embodiments of the present disclosure will be described.

Electrodes, which each include a catalyst layer containing a catalyst and a binder, may be used.

The catalyst may be platinum (Pt), an alloy or a mixture of platinum (Pt) and at least one metal selected from the group consisting of gold (Au), palladium (Pd), rhodium (Ru), iridium (Ir), ruthenium (Ru), tin (Sn), molybdenum (Mo), cobalt (Co), and chromium (Cr). The Pt, the alloy, or the mixture may be supported on a carbonaceous support. For example, the catalyst may be at least one metal selected from the group consisting of Pt, a PtCo alloy, and a PtRu alloy. These metals may be supported on a carbonaceous support.

The binder may be at least one of poly(vinylidenefluoride), polytetrafluoroethylene and a tetrafluoroethylene-hexafluoroethylene copolymer. The amount of the binder may be in the range of about 0.001 to about 0.5 parts by weight based on 1 part by weight of the catalyst. When the amount of the binder is within this range, the electrode catalyst layer may have strong binding ability to the support.

Any of the composite electrolyte membranes according to the embodiments of the present disclosure may be disposed between the two electrodes to manufacture the fuel cell.

According to embodiments of the present disclosure, by employing the electrolyte membrane with suppressed leakage of phosphoric acid due to being able to retain a large amount of phosphoric acid and having improved conductivity, good tensile strength characteristics, and no defects, the fuel cell may have improved lifetime characteristics.

According to embodiments of the disclosure, the fuel cell may have high performance in high-temperature, non-humidified conditions, for example, at a temperature of 100° C. or higher.

Substituents in the formulae above may be defined as follows.

As used herein, the term "alkyl" indicates a completely saturated, branched or unbranched (or a straight or linear) hydrocarbon.

Non-limiting examples of the "alkyl" group include methyl, ethyl, n-propyl, isopropyl, n-butyl, isobutyl, sec-butyl, t-butyl, isopentyl, neopentyl, iso-amyl, n-hexyl, 3-methylhexyl, 2,2-dimethylpentyl, 2,3-dimethylpentyl, n-heptyl, and the like.

At least one hydrogen atom of the alkyl group may be substituted with a halogen atom, a $C_1$-$C_{20}$ alkyl group substituted with a halogen atom (for example, $CCF_3$, $CHCF_2$, $CH_2F$, $CCl_3$, and the like), a $C_1$-$C_{20}$ alkoxy group, a $C_2$-$C_{20}$ alkoxyalkyl group, a hydroxyl group, a nitro group, a cyano group an amino group, an amidano group, hydrazine, hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxyl group, a $C_6$-$C_{20}$ heteroaryloxyalkyl group, or a $C_6$-$C_{20}$ heteroarylalkyl group.

The term "halogen atom" indicates fluorine, bromine, chloride, iodine, or the like.

The term "$C_1$-$C_{20}$ alkyl group substituted with a halogen atom" indicates a $C_1$-$C_{20}$ alkyl group substituted with at least one halo group. Non-limiting examples of the $C_1$-$C_{20}$ alkyl group substituted with a halogen atom include monohaloalkyl, dihaloalkyl, and polyhaloalkyls including perhaloalkyl.

Monohaloalkyls indicate alkyl groups including one iodine, bromine, chloride or fluorine. Dihaloalkyls and polyhaloalkyls indicate alkyl groups including at least two identical or different halo atoms.

As used herein, the term "alkoxy" represents "alkyl-O—", wherein the alkyl is the same as described above. Non-limiting examples of the alkoxy group include methoxy, ethoxy, propoxy, 2-propoxy, butoxy, t-butoxy, pentyloxy, hexyloxy, cyclopropoxy, cyclohexyloxy, and the like. At least one hydrogen atom of the alkoxy group may be substituted with substituents that are the same as those recited above in conjunction with the alkyl group.

As used herein, the term "alkoxyalkyl" indicates an alkyl group with a substituent that is the same as that recited above in conjunction with the alkoxy group. At least one hydrogen atom of the alkoxyalkyl group may be substituted with substituents that are the same as those recited above in conjunction with the alkyl group. As defined above, the term "alkoxyalkyl" refers to substituted alkoxyalkyl moieties.

As used herein, the term "alkenyl" indicates a branched or unbranched hydrocarbon with at least one carbon-carbon double bond. Non-limiting examples of the alkenyl group include vinyl, aryl, butenyl, isopropenyl, isobutenyl, and the like. At least one hydrogen atom in the alkenyl group may be substituted with a substituent that is the same as that recited above in conjunction with the alkyl group.

As used herein, the term "alkynyl" indicated a branched or unbranched hydrocarbon with at least one carbon-carbon triple bond. Non-limiting examples of the "alkynyl" group include ethynyl, butynyl, isobutynyl, isopropynyl, and the like.

At least one hydrogen atom of the "alkynyl" group may be substituted with substituents that are the same as those recited above in conjunction with the alkyl group.

As used herein, the term "aryl" group, which is used alone or in combination, indicates an aromatic hydrocarbon containing at least one ring.

The term "aryl" includes a group with an aromatic ring fused to at least one cycloalkyl ring.

Non-limiting examples of the "aryl" group include phenyl, naphthyl, tetrahydronaphthyl, and the like.

At least one hydrogen atom of the "aryl" group may be substituted with substituents that are the same as those recited above in conjunction with the alkyl group.

The term "arylalkyl" indicates an alkyl group substituted with an aryl group. Examples of the "arylalkyl" group include benzyl, phenyl-$CH_2CH_2$—, and the like.

As used herein, the term "aryloxy" indicates "—O-aryl". An example of the aryloxy group is phenoxy. At least one hydrogen atom of the "aryloxy" group may be substituted with substituents that are the same as those recited above in conjunction with the alkyl group.

As used herein, the term "heteroaryl group" indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring.

In the heteroaryl group, S or N may be present in various oxidized forms.

Examples of the monocyclic heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, 5-pyrimidin-2-yl, and the like.

The term "heteroaryl" indicates a heteroaromatic ring fused to at least one of an aryl group, a cycloaliphatic group, and a heterocyclic group.

Examples of the bicyclic heteroaryl group include indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoquinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, pyrimido[4,5-d]pyrimidinyl, and the like.

At least one hydrogen atom of the "heteroaryl" group may be substituted with substituents that are the same as those recited above in conjunction with the alkyl group.

The term "heteroarylalkyl" group indicates an alkyl group substitutued with a heteroaryl group.

The term "heteroaryloxy" group indicates a "—O-heteroaryl moiety". At least one hydrogen atom of the heteroaryloxy group may be substituted with substituents that are the same as those recited above in conjunction with the alkyl group.

The term "heteroaryloxyalkyl" group indicates an alkyl group substituted with a heteroaryloxy group. At least one hydrogen atom of the heteroaryloxyalkyl group may be substituted with substituents that are the same as those recited above in conjunction with the alkyl group.

As used herein, the term "carbocyclic" group indicates a saturated or partially unsaturated non-aromatic monocyclic, bicyclic or tricyclic hydrocarbon group.

Examples of the monocyclic hydrocarbon group include cyclopentyl, cyclopentenyl, cyclohexyl, cyclohexenyl, and the like.

Examples of the bicyclic hydrocarbon group include bornyl, decahydronaphthyl, bicyclo[2.1.1]hexyl, bicyclo[2.2.1]heptyl, bicyclo[2.2.1]heptenyl, bicyclo[2.2.2]octyl, and the like.

An example of the tricyclic hydrocarbon group is adamantyl.

At least one hydrogen atom of the "carbocyclic group" may be substituted with substituents that are the same as those recited above in conjunction with the alkyl group.

As used herein, the term "heterocyclic group" indicates a five- to ten-membered cyclic group including a heteroatom such as N, S, P, or O. An example of the heterocyclic group is pyridyl. At least one hydrogen atom in the heterocyclic group may be substituted with substituents that are the same as those recited above in conjunction with the alkyl group.

The term "heterocyclic oxy" indicates "—O-heterocycle". At least one hydrogen atom of the heterocyclic oxy group may be substituted with substituents that are the same as those recited above in conjunction with the alkyl group.

The term "sulfonyl" indicates R"—$SO_2$—, wherein R" is a hydrogen atom, alkyl, aryl, heteroaryl, aryl-alkyl, heteroarylalkyl, alkoxy, aryloxy, cycloalkyl, or a heterocyclic group.

The term "sulfamoyl" group refers to $H_2NS(O_2)$—, alkyl-$NHS(O_2)$—, (alkyl)$_2NS(O_2)$— aryl-$NHS(O_2)$—, alkyl-(aryl)-$NS(O_2)$—, (aryl)$_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom of the sulfamoyl group may be substituted with substituents that are the same as those recited above in conjunction with the alkyl group.

The term "amino group" indicates a group with a nitrogen atom covalently bonded to at least one carbon or hetero atom. The amino group may refer to, for example, —NH$_2$ and substituted moieties.

The term "amino group" also refers to an "alkylamino group" with nitrogen bound to at least one additional alkyl group, and "arylamino" and "diarylamino" groups with at least one or two nitrogen atoms bound to a selected aryl group.

The terms "alkylene", "alkenylene", "alkynylene", "arylene", and "heteroarylene" are respectively defined to be same as the monovalent "alkyl", "alkenyl", "alkynyl", "aryl" and "heteroaryl" described above, except that they are divalent groups.

At least one hydrogen atom of the respective "alkylene", "alkenylene", "alkynylene", "arylene", and "heteroarylene" groups may be substituted with substituents that are the same as those recited above in conjunction with the alkyl group.

The fuel cell including the electrode with improved electrical conductive characteristics may have improved cell performance, in terms of current density. The fuel cell is suitable for use in high-temperature, non-humidified conditions.

Hereinafter, one or more embodiments of the present invention will be described in detail with reference to the following examples. These examples are not intended to limit the purpose and scope of the one or more embodiments of the present invention.

Example 1C

Manufacture of Composite Electrolyte Membrane

A first electrolyte membrane forming composition containing 2 g of the compound of Formula 8, 1.08 g of the compound (m-PBI) of Formula 171, and 20 g of N,N'-dimethylacetamide (DMAc) solvent was cast on a glass substrate, and was then thermally treated at about 220° C. for about 300 minutes to form a first electrolyte membrane having a thickness of about 10 μm.

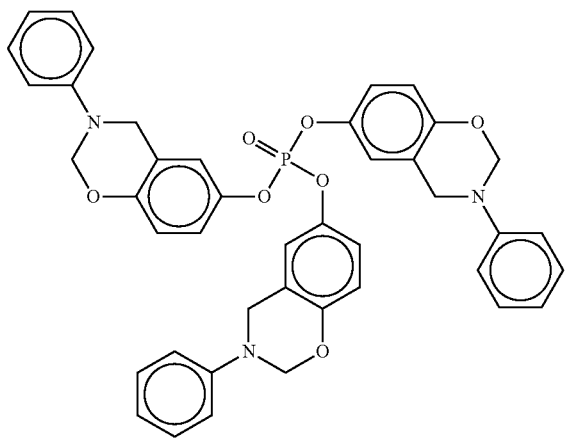

<Formula 8>

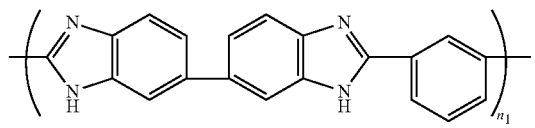

<Formula 171>

In Formula 171, n$_1$ is an integer of 30.

A second electrolyte membrane forming composition containing 2 g of the compound of Formula 114, 1.08 g of the compound of Formula 171, and 20 g of N,N'-dimethylacetamide (DMAc) was cast on a surface of the first electrolyte membrane, and was then thermally treated at about 220° C. for about 5-15 hours to form a second electrolyte membrane having a thickness of about 40 μm.

<Formula 114>

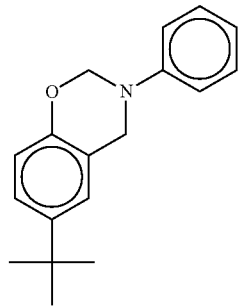

<Formula 171>

In Formula 171, n$_1$ is an integer of about 30.

The first electrolyte membrane forming composition containing 2 g of the compound of Formula 8, 2 g of the compound of Formula 171, and 20 g of N,N'-dimethylacetamide (DMAc) solvent was cast on a surface of the second electrolyte membrane, and was then thermally treated at about 220° C. for about 300 to about 900 minutes to form another first electrolyte membrane having a thickness of about 10 μm.

<Formula 8>

<Formula 171>

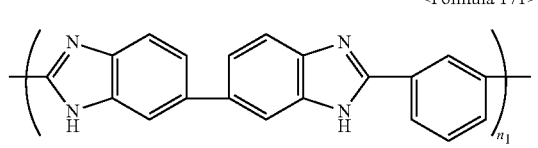

In Formula 171, n$_1$ is an integer of 30.

The glass substrate with the electrolyte membranes in film form was immersed in hot water for about 1 hour, and the film was then separated from the glass substrate. The film was removed from the hot water, and the remaining water was wiped off from surfaces of the film. Then, the film was dried in a vacuum oven for 24 hours or longer to obtain a composite electrolyte membrane having a thickness of about 60 μm.

Example 2

Manufacture of Composite Electrolyte Membrane

A composite electrolyte membrane was manufactured in the same manner as in Example 1, except that the first electrolyte membrane was formed to have a thickness of about 20 μm.

Manufacture Example 1

Manufacture of Fuel Cell 1 g of a catalyst including 50% by weight of PtCo loaded on carbon, and 3 g of N-methylpyrrolidone (NMP) as a solvent were added to a stirring vessel, and the mixture was stirred to prepare a slurry. Subsequently, a solution of 5 wt % of polyvinylidene fluoride in N-methylpyrrolidone (NMP) was added to the slurry until the amount of polyvinylidene fluoride in the mixture reached 0.025 g. The mixture was mixed for 10 minutes to prepare a slurry for forming a cathode catalyst layer.

Carbon paper was cut to a size of 4 7 cm$^2$, fixed on a glass plate, and coated with the slurry using a doctor blade (Sheen Instruments Ltd) with a gap of about 600 μm.

The slurry for the cathode catalyst layer was coated on the carbon paper using a doctor blade (Sheen Instrument) with a gap of 600 μm, and dried at room temperature for one hour, at 80° C. for one hour, at 1200° C. for 30 minutes, and at 150° C. for 15 minutes to form cathodes (fuel electrodes).

Anodes were manufactured as follows.

2 g of a Pt catalyst (50 wt % of Pt supported on carbon) and 9 g of N-methylpyrrolidone (NMP) solvent were put into a stirring vessel, and stirred using a high-speed stirrer for two minutes.

Subsequently, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer, using a bar coater, to complete the manufacture of the anode.

The amount of PtCo loaded in the cathode was about 2.33 mg/cm$^2$, and the amount of Pt loaded in the anode was 1.4 mg/cm$^2$.

The composite electrolyte membrane of Example 1 was disposed between the cathode and the anode to manufacture an MEA. The cathode and the anode were used without impregnated with phosphoric acid.

To prevent gas permeation between the cathode and the anode, a polytetrafluoroethylene (PTFE) membrane main-gasket having a thickness of 200 μm and a PTFE membrane sub-gasket having a thickness of 20 μm were joined and disposed between each of the anode and cathode, and the electrolyte membrane. The pressure applied to the MEAs was adjusted using a torque wrench, and was stepwise increased using 1, 2, and 3 N-m Torque wrenches.

Evaluation Example 1

Evaluation of Phosphoric Acid-Based Material Retention Ratio

Electricity was generated by supplying hydrogen to the anode (flow rate: 100 ccm) and air to the cathode (flow rate: 250 ccm), at 150° C. under the conditions of not humidifying the electrolyte membrane, and characteristics of the fuel cell were measured. Due to using the phosphoric acid-doped electrolyte, the fuel cell performance should improve with time. Accordingly, the fuel cell was activated until the operating voltage reached a peak voltage, and then the characteristics of the fuel cell were evaluated. In addition, the surface areas of the cathode and the anode were fixed to 2.8 2.8 (7.84 cm$^2$). The thickness of the cathode was about 430 μm, and the thickness of the anode was about 390 μm.

A phosphoric acid-based material retention ratio was evaluated for the composite electrolyte membrane of Example 1, and each of the first and second electrolyte membranes forming the composite electrolyte membrane of Example 1 according to the following method. For this evaluation, the composite electrolyte membrane and the first and second electrolyte membranes were formed to have the same thickness.

Each electrolyte membrane was immersed in 85 wt % phosphoric acid at about 80° C. for about 1 hour for impregnation. The phosphoric acid-based material retention ratio was calculated according to Equation 1 using the weights of the electrolyte membrane before and after impregnation with the phosphoric acid.

Phosphoric acid-based material retention ratio(%)= (Weight of electrolyte membrane after impregnation with phosphoric-acid based material−Weight of electrolyte membrane before impregnation with phosphoric acid-based material)/(Weight of electrolyte membrane before impregnation with phosphoric acid-based material)×100   [Equation 1]

The evaluation results of the phosphoric acid-based material retention ratio are shown in Table 1 below.

TABLE 1

| Sample | Phosphoric acid-based material retention ratio (%) |
|---|---|
| Composite electrolyte membrane of Example 1 | 800~1000 |
| First electrolyte membrane of Example 1 | 400 |
| Second electrolyte membrane of Example 1 | 300 |

Referring to Table 1, the composite electrolyte membrane of Example 1 is found to have a high phosphoric acid-based material retention ratio relative to the first and second electrolyte membranes.

Evaluation Example 2

Measurement of Tensile Strength

Tensile strengths of the first and second electrolyte membranes forming the composite electrolyte membrane of Example 1 were measured. The results are shown in Table 2.

The tensile strengths of the first and second electrolyte membranes, which were formed to have the same thickness, were measured using a universal testing machine (UTM, Lloyd LR-10K). Samples for the measurement were prepared according to ASTM standard D638 (Type V specimens).

TABLE 2

| Sample | Tensile strength (MPa) |
| --- | --- |
| First electrolyte membrane | 2~3 |
| Second electrolyte membrane (Core electrolyte membrane) | 6-8 |

Figure 2:
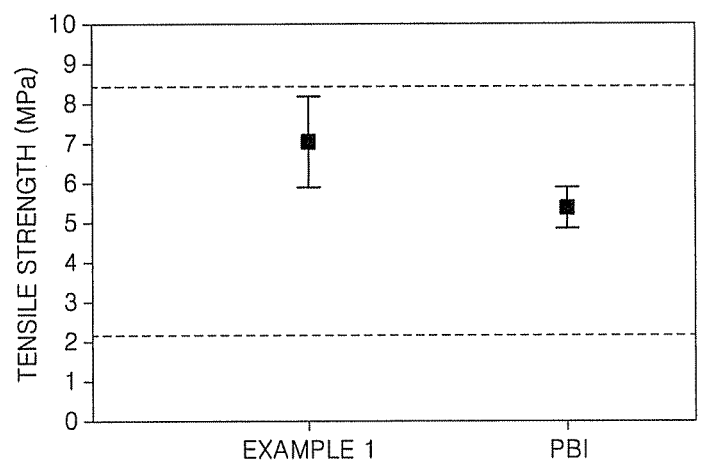
FIG. 2 is a graph illustrating tensile strength characteristics of the composite electrolyte membrane of Example 1.

Tensile strength of the composite electrolyte membrane of Example 1 was measured. The results are shown in FIG. 2. For comparison, the tensile strength of the composite electrolyte membrane of Example 1 and that of a polybenzimidazole (PBI) electrolyte membrane using PBI of Formula 171 are shown in FIG. 2.

The tensile strengths of the electrolyte membranes were measured using a universal testing machine (UTM, Lloyd LR-10K). Samples for the measurement were prepared according to ASTM standard D638 (Type V specimens).

Referring to FIG. 2, the composite electrolyte membrane of Example 1 is found to have a much greater tensile strength than the PBI electrolyte membrane.

Evaluation Example 3

Measurement of Conductivity

Figure 3:
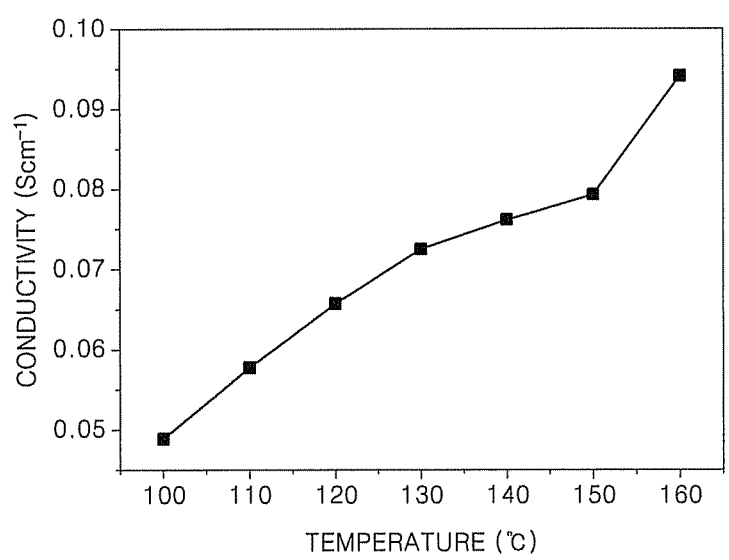
FIG. 3 is a graph of conductivity with respect to temperature of the composite electrolyte membrane of Example 1.

Changes in conductivity with respect to temperature were measured using the composite electrolyte membrane of Example 1. The results are shown in FIG. 3. After impregnation of the composite electrolyte membrane with phosphoric acid, resistance with respect to temperature was measured while applying a voltage bias of 10 mV at a frequency of about 1 Hz to 1 MHz. Referring to FIG. 3, the composite electrolyte membrane of Example 1 is found to have high conductivity.

Figure 4:
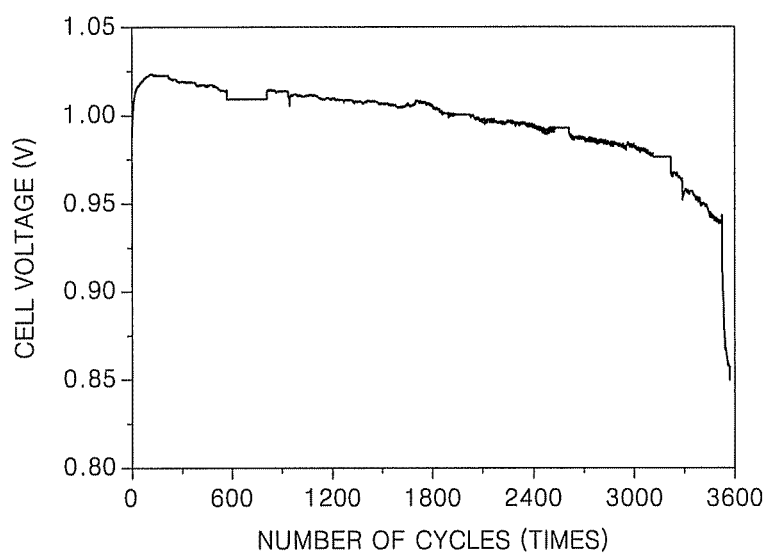
FIG. 4 is a graph of cell voltage with respect to number of cycles in a fuel cell manufactured in Manufacture Example 1.

Changes in cell voltage and power density with respect to number of cycles of the fuel cell of Manufacture Example 1 were measured. The results are shown in FIG. 4. Referring to FIG. 4, the fuel cell of Manufacture Example 1 is found to have a good lifetime characteristic.

Evaluation Example 4

Measurement of Lifespan

Figure 5:
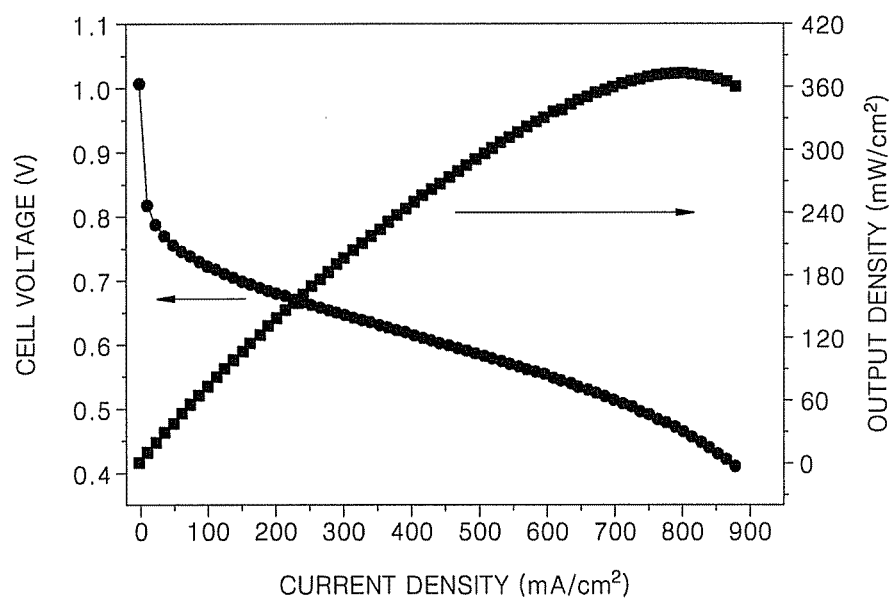
FIG. 5 is a graph of cell voltage with respect to current density of the fuel cell manufactured in Manufacture Example 1.

A change in cell voltage with respect to current density of the fuel cell of Manufacture Example 1 was measured. The results are shown in FIG. 5. Referring to FIG. 5, the fuel cell of Manufacture Example 1 is found to have good cell performance characteristics.

Evaluation Example 5

Measurement of Thickness Change Ratio

Thickness change ratio was evaluated for the composite electrolyte membrane of Example 1, and each of the first and second electrolyte membranes forming the composite electrolyte membrane of Example 1 according to the following method. For comparison with the composite electrolyte membrane of Example 1, the thickness change ratio of a PBI electrolyte membrane formed using m-PBI of Formula 171 is also shown in Table 3.

For this evaluation, according to Example 1, a first electrolyte membrane, a second electrolyte membrane, and a composite electrolyte membrane were formed to have the same thickness, and then the weights thereof were measured. Afterward, the first electrolyte membrane, the second electrolyte membrane, and the composite electrolyte membrane were each immersed in about 85 wt % of aqueous phosphoric acid solution for about 240 minutes. After being removed from the solution, the first electrolyte membrane, the second electrolyte membrane, and the composite electrolyte membrane were weighed. Then, their thickness change ratios were calculated using Equation 2 below.

Thickness change ratio(%)=(Thickness of electrolyte membrane after impregnation with aqueous phosphoric acid-based material solution−Thickness of electrolyte membrane before impregnation with aqueous phosphoric acid-based material solution)×100     [Equation 2]

The measurement results of thickness change ratio are shown in Table 3 below.

TABLE 3

| Sample | Thickness change ratio (%) |
| --- | --- |
| Composite electrolyte membrane | 135 |
| First electrolyte membrane | 150 |
| Second electrolyte membrane (Core electrolyte membrane) | 125 |
| PBI electrolyte membrane | 200 |

As described above, according to the one or more of the above embodiments of the present disclosure, a composite electrolyte membrane for a fuel cell may hold a large amount of phosphoric acid, may have improved conductivity due to suppressed leakage of the phosphoric acid, and may have high durability. By using the composite electrolyte membrane, a fuel cell with improved cell performance may be manufactured.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composite electrolyte membrane for a fuel cell, comprising:

a core electrolyte membrane; and first electrolyte membranes disposed on opposite surfaces of the core electrolyte membrane and comprising a compound having a phosphoric acid-based material-containing functional group, wherein the phosphoric acid-based material retention ratio of the first electrolyte membrane is higher than that of the core electrolyte membrane, wherein the core electrolyte membrane comprises a second electrolyte membrane including a polymer that is a polymerization product of a composition including at least one compounds represented by Formulae 5 or 6 below:

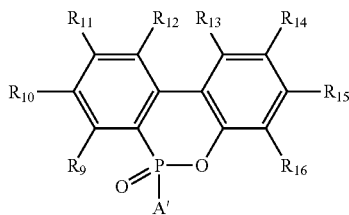

Formula 5 in Formula 5, A' is a substituted or unsubstituted $C_1$-$C_{20}$ heterocyclic group, a substituted or unsubstituted $C_4$-$C_{20}$ carbocyclic group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ carbocyclic group, a $C_1$-$C_{20}$ heterocyclic group, a halogen atom, a cyano group, or a hydroxy group, Formula 6

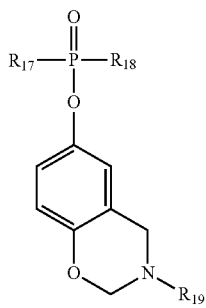

Formula 6 in Formula 6, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 6A below:

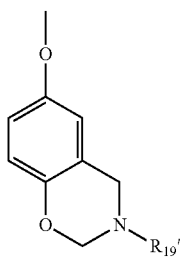

Formula 6A in Formulae 6 and 6A, $R_{19}$ and $R_{19'}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

2. The composite electrolyte membrane of claim 1, wherein the thickness change ratio of the core electrolyte membrane is less than that of the first electrolyte membrane.

3. The composite electrolyte membrane of claim 1, wherein the core electrolyte membrane has a thickness change ratio of about 105% to about 130%.

4. The composite electrolyte membrane of claim 1, wherein the first electrolyte membrane has a phosphoric acid-based material retention ratio of about 400% to about 500%.

5. The composite electrolyte membrane of claim 1, wherein the tensile strength of the core electrolyte membrane is greater than that of the first electrolyte membrane.

6. The composite electrolyte membrane of claim 1, wherein the gap in tensile strength between the core electrolyte membrane and the first electrolyte membrane is from about 4 Mpa to about 5 Mpa.

7. The composite electrolyte membrane of claim 1, wherein the compound having a phosphoric acid-based material-containing functional group is a first polymer that is a polymerization product of a composition including at least one compound selected from among compounds represented by Formulae 1 to 4 below:

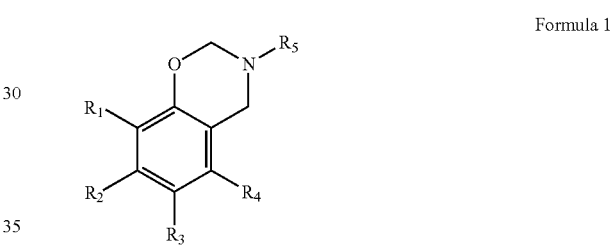

Formula 1 in Formula 1, $R_1$, $R_2$, $R_3$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group,

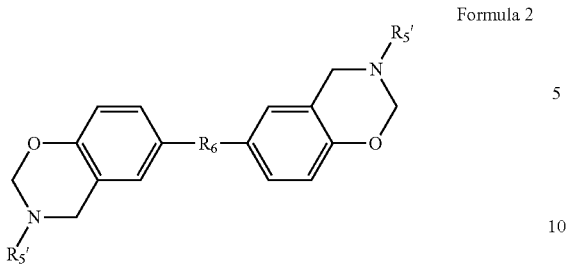

Formula 2 in Formula 2, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—,

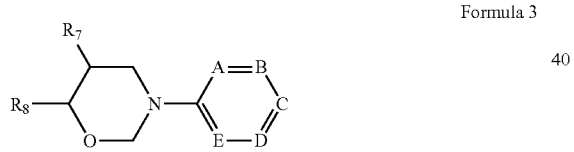

Formula 3 in Formula 3, A, B, C, D and E are all carbon; or one or two of A, B, C, D and E is nitrogen and the others are carbon; and $R_7$ and $R_8$ are linked to form a ring, wherein the ring is a $C_6$-$C_{10}$ carbocyclic group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group,

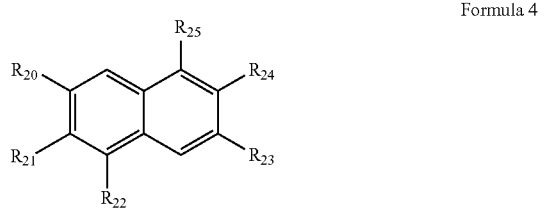

Formula 4 in Formula 4, at least two adjacent groups selected from among $R_{20}$, $R_{21}$ and $R_{22}$ are linked to form a group represented by Formula 4A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group; and at least two adjacent groups selected from among $R_{23}$, $R_{24}$ and $R_{25}$ are linked to form the group represented by Formula 4A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group,

Formula 4A in Formula 4A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and

* denotes the sites at which the at least two adjacent groups selected from among $R_{20}$, $R_{21}$ and $R_{22}$ of Formula 4 and the at least two adjacent groups selected from among $R_{23}$, $R_{24}$ and $R_{25}$ are linked, respectively.

8. The composite electrolyte membrane of claim 7, wherein the composition further comprises at least one cross-linkable compound selected from the group consisting of a polyazole-based material, polyimide and polyoxazole.

9. The composite electrolyte membrane of claim 8, wherein the amount of the cross-linkable compound is from about 5 parts to about 210 parts by weight based on 100 parts by weight of at least one of the compounds of Formulae 1 to 4.

10. The composite electrolyte membrane of claim 1, wherein the composition further comprises at least one cross-linkable compound selected from the group consisting of a polyazole-based material, polyimide and polyoxazole.

11. The composite electrolyte membrane of claim 1, wherein the amount of the cross-linkable compound is from about 5 parts to about 210 parts by weight based on 100 parts by weight of at least one of the compounds of Formulae 5 and 6.

12. The composite electrolyte membrane of claim 1, wherein the thickness ratio of the core electrolyte membrane to the first electrolyte membrane is from about 0.1:1 to about 4:1.

13. The composite electrolyte membrane of claim 1, wherein the first electrolyte membrane comprises a polymer that is a polymerization product of a compound represented by Formula 8 below and polybenzimidazole:

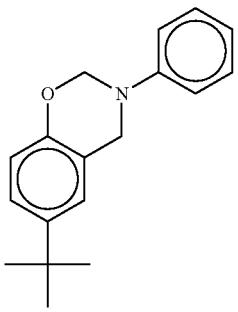

Formula 8

14. The composite electrolyte membrane of claim 1, wherein the second electrolyte membrane comprises a polymer that is a polymerization product of a composition containing a compound represented by Formula 114 below and polybenzimidazole:

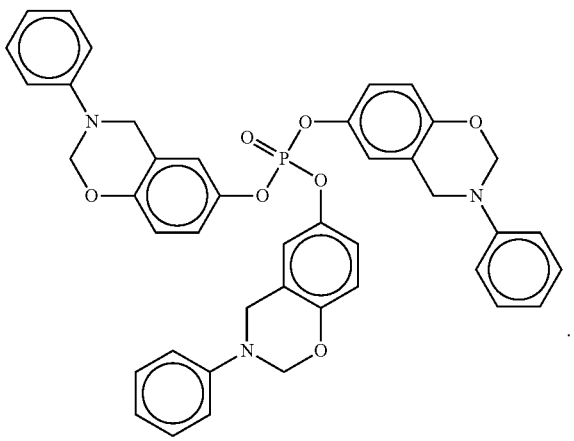

Formula 114

15. The composite electrolyte membrane of claim 1, further comprising a first electrolyte membrane, wherein the composite electrolyte membrane has a 3-layer structure with the second electrolyte membrane disposed between the first electrolyte membranes forming a sequential stack of the first/second/first electrolyte membrane.

16. A method of manufacturing the electrolyte membrane for a fuel cell comprising a core electrolyte membrane; and first electrolyte membranes disposed on opposite surfaces of the core electrolyte membrane and comprising a compound having a phosphoric acid-based material-containing functional group, wherein the phosphoric acid-based material retention ratio of the first electrolyte membrane is higher than that of the core electrolyte membrane, the method comprising: coating a composition including a compound having a phosphoric acid-based material-containing functional group and a first solvent on a substrate and thermally treating the coated product to form a first electrolyte membrane;

forming a core electrolyte membrane on a surface of the first electrolyte membrane;

coating a composition including a compound having a phosphoric acid-based material-containing functional group and the first solvent on a surface of the core electrolyte membrane and thermally treating the coated product to form another first electrolyte membrane, thereby forming the composite electrolyte membrane; and separating the composite electrolyte membrane from the substrate.

17. The method of claim 16, wherein the composition further comprises at least one cross-linkable compound selected from the group consisting of a polyazole-based material, polyimide and polyoxazole.

18. The method of claim 16, wherein the forming of the core electrolyte membrane comprises coating a composition including at least one of compounds represented by Formulae 5 and 6 below and a second solvent and thermally treating a coated product:

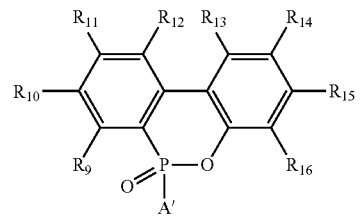

Formula 5 in Formula 5, A' is a substituted or unsubstituted $C_1$-$C_{20}$ heterocyclic group, a substituted or unsubstituted $C_4$-$C_{20}$ carbocyclic group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ carbocyclic group, a $C_1$-$C_{20}$ heterocyclic group, a halogen atom, a cyano group, or a hydroxy group,

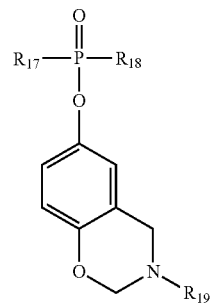

Formula 6 in Formula 6, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 6A below:

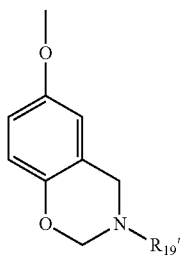

Formula 6A in Formulae 6 and 6A, $R_{19}$ and $R_{19'}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

19. The method of claim 18, wherein the composition further comprises at least one cross-linkable compound selected from the group consisting of a polyazole-based material, polyimide and polyoxazole.

20. A method for manufacturing the composite electrolyte membrane for a fuel cell comprising a core electrolyte membrane; and first electrolyte membranes disposed on opposite surfaces of the core electrolyte membrane and comprising a compound having a phosphoric acid-based material-containing functional group, wherein the phosphoric acid-based material retention ratio of the first electrolyte membrane is higher than that of the core electrolyte membrane, the method comprising forming first electrolyte membranes on opposite surfaces of a core electrolyte membrane by coating a composition including a compound having a phosphoric acid-based material-containing functional group and a first solvent on the opposite surfaces of the core electrolyte membrane and thermally treating the coated product.

21. The method of claim 20, wherein the composition further comprises at least one cross-linkable compound selected from the group consisting of a polyazole-based material, polyimide and polyoxazole.

22. The method of claim 20, wherein the core electrolyte membrane is formed by a method comprising:
coating a composition including at least one of compounds represented by Formulae 5 and 6 below and a second solvent on a substrate and thermally treating a coated product, thereby forming a second electrolyte membrane; and
separating the second electrolyte membrane from the substrate:

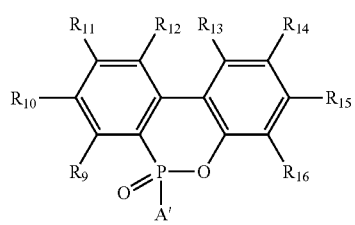

Formula 5 in Formula 5, A' is a substituted or unsubstituted $C_1$-$C_{20}$ heterocyclic group, a substituted or unsubstituted $C_4$-$C_{20}$ carbocyclic group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ carbocyclic group, a $C_1$-$C_{20}$ heterocyclic group, a halogen atom, a cyano group, or a hydroxy group,

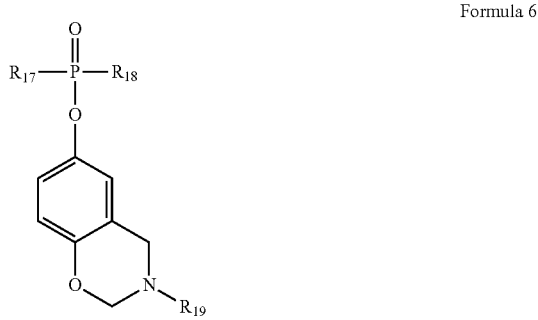

Formula 6 in Formula 6, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 6A below:

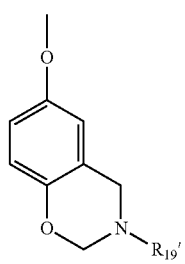

Formula 6A in Formulae 6 and 6A, $R_{19}$ and $R_{19'}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

23. The method of claim 22, wherein the composition further comprises at least one cross-linkable compound selected from the group consisting of a polyazole-based material, polyimide and polyoxazole.

24. A fuel cell comprising the composite electrolyte membrane according to claim 1.

* * * * *